United States Patent
Ernst

(10) Patent No.: US 12,308,780 B2
(45) Date of Patent: May 20, 2025

(54) STEPPER MOTOR CONTROL

(71) Applicant: Analog Devices International Unlimited Company, Limerick (IE)

(72) Inventor: Thomas Ernst, Pinneberg (DE)

(73) Assignee: Analog Devices International Unlimited Company, Limerick (IE)

(*) Notice: Subject to any disclaimer, the term of this patent is extended or adjusted under 35 U.S.C. 154(b) by 109 days.

(21) Appl. No.: 18/233,080

(22) Filed: Aug. 11, 2023

(65) Prior Publication Data

US 2025/0055394 A1 Feb. 13, 2025

(51) Int. Cl.
*H02P 8/22* (2006.01)
*H02P 8/18* (2006.01)

(52) U.S. Cl.
CPC . *H02P 8/22* (2013.01); *H02P 8/18* (2013.01)

(58) Field of Classification Search
CPC .... H02P 1/022; H02P 1/04; H02P 8/18; H02P 7/29; H02P 27/08; H02P 7/04; H02P 29/024; H02P 8/22; H02P 8/12; G01R 19/16547; G01R 19/16519; G01R 19/0092; G01R 1/20; H03M 1/001; H03K 5/24; H03K 17/6871; H03K 3/3565; H03K 17/687
See application file for complete search history.

(56) References Cited

U.S. PATENT DOCUMENTS

| | | | |
|---|---|---|---|
| 8,564,230 B2 | 10/2013 | Dwersteg et al. | |
| 9,030,150 B2 | 5/2015 | Dwersteg | |
| 9,112,439 B2 | 8/2015 | Larsson et al. | |
| 10,075,113 B2 | 9/2018 | Dwersteg | |
| 11,437,943 B2 | 9/2022 | Dwersteg | |
| 2002/0008491 A1* | 1/2002 | Aoshima | H02P 8/22 318/696 |
| 2022/0123673 A1 | 4/2022 | Dwersteg | |

* cited by examiner

*Primary Examiner* — Said Bouziane
(74) *Attorney, Agent, or Firm* — Schwegman Lundberg & Woessner, P.A.

(57) ABSTRACT

A new method and circuit arrangement for operating a stepper motor in a voltage-based operating mode with a control loop over the whole operating range of speeds of a stepper motor. The method/circuit arrangement includes calculating a load angle of the stepper motor. The load angle is then used to calculate a voltage-based control signal suitable for operating a known motor driver circuit, such as a chopper, to drive the stepper motor coils. This enables improved control over the stepper motor which can improve control stability.

20 Claims, 11 Drawing Sheets

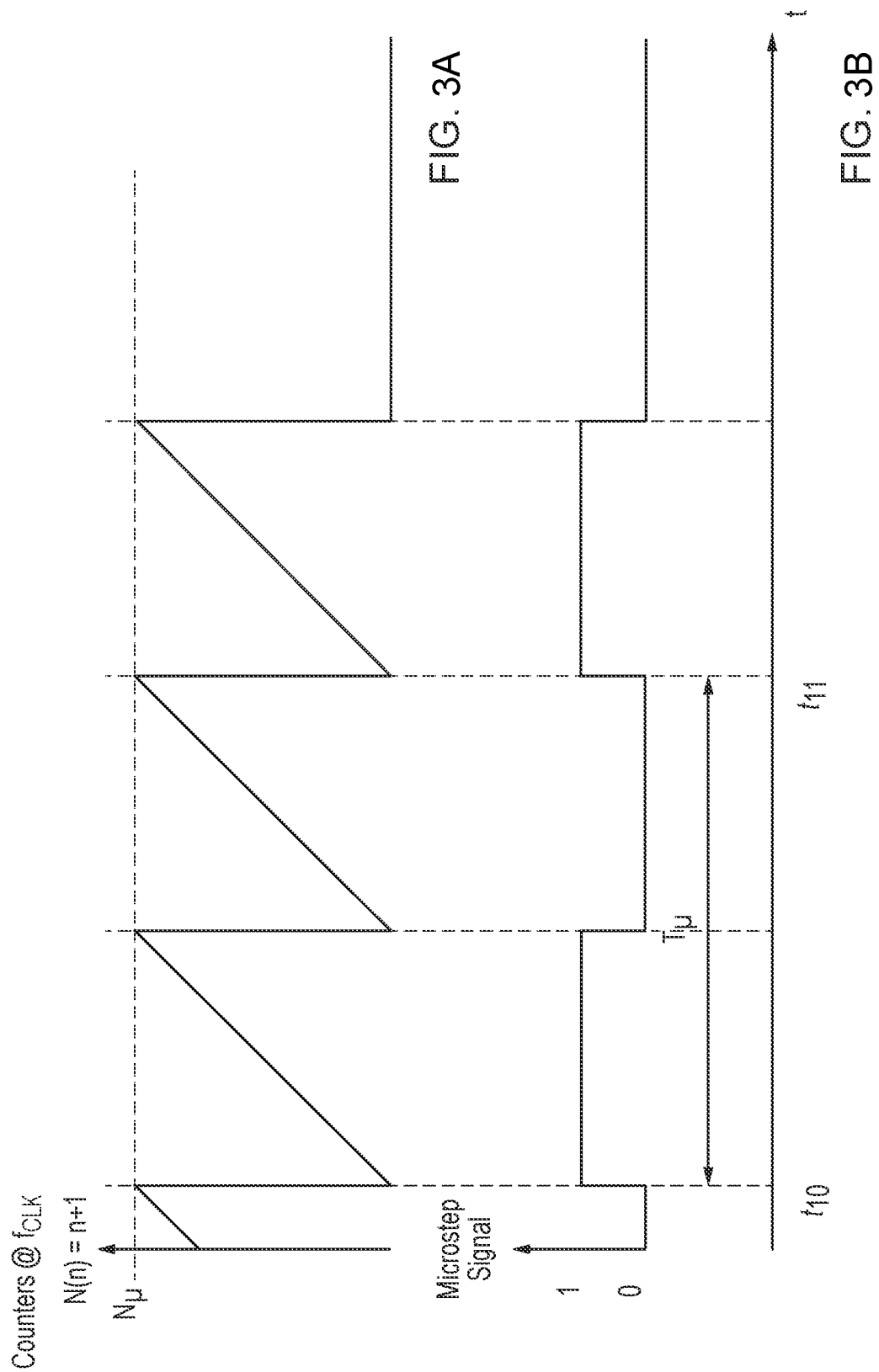

STEPPER MOTOR CONTROL

FIELD

The present application relates to methods and circuit arrangements for controlling a stepper motor. Specifically, the present application relates to methods and circuit arrangements for controlling a stepper motor with high resolution micro-stepping.

BACKGROUND

It is generally known that in stepper motors a magnetic rotor is turned stepwise by each a small angle by means of a controlled rotating electromagnetic field which is generated by the motor's stator coils.

Frequently, it is desired to rotate the motor with small step angles in order to achieve an as high as possible resolution, exactness of the positioning and a uniform course of the motor torque. For these reasons, instead of using full-step and half-step operation, a so called micro-step operation is preferred in which the currents flowing through the motor coils are not only switched on and off, but also increase and decrease in a certain manner. The resolution and the uniformity with which the stepper motor conducts the micro-steps may be substantially dependent upon the number of different current amplitude values with which the motor coils can be operated and how exactly these can be kept. Usually, it is most appropriate to excite the motor coils with a sinusoidal- and cosine-wave, respectively, because with this, a very continuous and jerk-free rotation of a microstep-optimized motor. Thus, a smooth motor operation can be obtained.

For electrically controlling stepper motors, especially in the micro-step operation, chopper methods may be used. One chopper method is a voltage-based (i.e. voltage-controlled or voltage-regulated) operating mode in which the required coil current is generated by means of a voltage which is applied to the motor coils and which is adjusted by changing its amount (or its amplitude) and its direction (or polarity).

In some cases, chopper methods generated by a chopper are supplied to a motor coil driver circuit, such that the actual coil current follows over its entire (e.g. sine-shaped) course (namely during the increasing and decreasing sections of the coil current) as far as possible promptly and exactly corresponding to a specified current (target coil current) for a motor coil and is at least substantially not influenced by the voltage which is counter-induced by the rotor within the motor coils (counter EMF) or other effects. In other words, each period of the actual coil current is composed of a plurality of chopper phases, by means of which each target coil current value of the current period at each instant of time of the activation of the related chopper phase is generated by means of a voltage applied to the motor coils.

For example, the chopper may output a voltage e.g., a PWM voltage, generated using the motor supply voltage in order to provide the actual coil current to each coil. In particular, the motor supply voltage can be pulse-width-modulated and applied with corresponding polarity to the motor coils, the duty factor of this modulation being controlled or regulated in such a way that the resulting effective voltage across the motor coils each has an amount which causes the instantaneous target coil current value to flow.

However, there exists problems with operating a stepper motor in a micro-step mode of operation to achieve a higher resolution of positioning. A higher resolution of positioning requires high cost, die size, and engineering effort to implement.

SUMMARY OF THE DISCLOSURE

As a brief non-limiting overview, the present disclosure provides new methods and circuit arrangements for operating a stepper motor with a micro-stepping mode of operation. In contrast to expanding the number of micro-step values in a micro-step sequencer, the disclosure provides an additional fractional register (i.e., a nano-step register) which provides a fraction between the current micro-step value and the next micro-step value to be applied to the stepper motor. An interpolator receives the current micro-step value, the next micro-step value, and the fraction, and the interpolates between the current micro-step value and the next micro-step value, based on the fraction. The output of the interpolator provides a new nano-step value (or offset which can be added to the current micro-step value) which can be applied to the stepper motor.

Beneficially, this may result in improved positional accuracy, reduced motor resonance, quieter motor operation, while also reducing the implemented die size, reducing the engineering effort to implement the additional nano-steps, reduces overall costs. Finally, the disclosure provides easier adaptations of the number of nano-steps of the system by changing the number of fractional values in the nano-step register, e.g., by changing the number of fractional values in the nano-step register from 1 to 8, an eight-fold increase in positional accuracy can be achieved. Assuming a 256 micro-step system, this results in a change of 256 stepper motor positions per electrical cycle, to 2048 stepper motor positions per electrical cycle. That is, adding 7 values to the nano-step register can reduce the design effort and die size requirements equivalent to implementing, 1792*the number of motor coils of the stepper motor, additional values in a micro-step sequencer.

According to a first aspect there is provided a circuit arrangement for operating a stepper motor, the circuit arrangement comprising:
 a micro-step sequencer configured to:
  store a plurality of micro-step values associated with discrete values of a quantised waveform,
  output at least: a first micro-step value associated with a first phase angle position of the quantised waveform; and a second micro-step value associated with a second phase angle position of the quantised waveform;
 a register configured to store a fractional value, wherein the fractional value represents a fraction between the first micro-step value and the second micro-step value;
 an interpolator configured to:
  receive the first micro-step value, the second micro-step value, and the fractional value;
  interpolate, between the first micro-step value and the second micro-step value, based on the fractional value;
  determine a fractional micro-step value from the interpolation;
 wherein circuit arrangement is configured to:
 operate the stepper motor based on the fractional micro-step value.

Optionally, the stepper motor comprises at least a first motor coil and a second motor coil.

Optionally, the register is configured to store at least one fractional value, wherein a fractional value represents a fraction between the first micro-step value and the second micro-step value.

Optionally, the circuit arrangement comprises an adder configured to add the first micro-step value and the fractional micro-step value. Optionally, the stepper motor is operated based on the output of the adder.

Optionally, the circuit arrangement comprises a timing unit for operating the stepper motor to a target position. Optionally, the timing unit determines a time rate. Optionally, the micro-step sequencer is configured to output one micro-step value upon each period of the time rate. Optionally, the interpolator is configured to determine one fractional micro-step value, based on a corresponding fractional value, upon each period of the time rate.

Optionally, the micro-step sequencer is configured to output a plurality of micro-step values upon each period of the time rate. Optionally the plurality of micro-step values comprises the first and second micro-step values. Optionally, the interpolator is configured to determine a plurality of fractional micro-step values, based on a corresponding fractional value, upon each period of the time rate. Optionally, the plurality of fractional micro-step values comprises the fractional micro-step value.

Optionally, the adder is configured to add the first micro-step value and the fractional micro-step value once per time rate.

Optionally, the circuit arrangement comprises a timing unit for operating the stepper motor at a target velocity. Optionally, the timing unit determines a first time rate and a second time rate. Optionally, the second time rate is a multiple of the first time rate. Optionally, the micro-step sequencer is configured to output one micro-step value upon each period of the first time rate. Optionally, the interpolator is configured to determine one fractional micro-step value upon each period of the second time rate.

Optionally, the interpolator is configured to determine a plurality of fractional micro-step values upon each period of the second time rate. Optionally, the plurality of fractional micro-step values comprises the fractional micro-step value. Optionally, the one fractional micro-step value is any of the plurality of fractional micro-step values. Optionally, the fractional value is any one of the plurality of fractional values in the register. Optionally, the register is a cyclic register which cyclically steps though each address of the register. Optionally, upon each period of the second time rate a new (e.g., different) fractional micro-step value, corresponding to one fractional value of the cycle, is determined.

Optionally, the adder is configured to add the first micro-step value and the fractional micro-step value once per second time rate.

Optionally, the fractional value is a fraction represented by the mathematical expression 1/b, where b is an integer number. Optionally, the second time rate is the multiple of b times the first time rate.

Optionally, the circuit arrangement comprises a switch which disconnects the interpolator output if the velocity of the stepper motor rotor is greater than a velocity threshold.

Optionally, the fractional micro-step value represents a phase angle position between the first phase angle position and the second phase angle position.

Optionally, the micro-step sequencer comprises a look-up table. Optionally, the first micro-step value is in a first row of the look-up table, and the second micro-step value is in a second row of the look-up table. Optionally, the second row immediately follows the first row.

Optionally, the micro-step sequencer is configured to receive a signal which increments the position of the quantised waveform.

Optionally, a target current value is determined based on the fractional micro-step value and the stepper motor is operated based on the target current value.

Optionally, the target current value is a vector representing the target current of the first motor coil and the target current of the second motor coil.

Optionally, the quantised waveform is sinusoidal.

Optionally, wherein the interpolator is a linear interpolator configured to linearly interpolate between the first micro-step value and the second micro-step value to generate the fractional micro-step value.

Optionally, the interpolator is a filter configured to filter the first micro-step value and the second micro-step value to generate the fractional micro-step value.

Optionally, the interpolator is a weighted time slot assignment applied to the first micro-step value and the second micro-step value to generate the fractional micro-step value.

Optionally, all of the types of interpolation (e.g., linear, filter, weighted time slot assignment, etc.) may be implemented as alternatives or may be combined.

According to a second aspect there is provided a method for determining a target current of one or more motor coils of a stepper motor, the method comprising:

providing a quantised waveform representing micro-stepped current;

generating a first micro-step value associated with a first phase angle position of the quantised waveform;

generating a second micro-step value associated with a second phase angle position of the quantised waveform;

providing a fractional value representing a fraction between the first micro-step value and the second micro-step value;

interpolating, between the first micro-step value and the second micro-step value, based on the fractional value, to generate a fractional micro-step value;

generating a target current value based on the fractional micro-step value, wherein the target current value is suitable for operating the stepper motor.

According to a third aspect there is provided a method for determining a target current of one or more motor coils of a stepper motor, the method comprising:

providing, by a micro-step sequencer, a quantised waveform representing micro-stepped current;

generating, by the micro-step sequencer, a first micro-step value associated with a first phase angle position of the quantised waveform;

generating, by the micro-step sequencer, a second micro-step value associated with a second phase angle position of the quantised waveform;

providing, by a register, a fractional value representing a fraction between the first micro-step value and the second micro-step value;

interpolating, by an interpolator, between the first micro-step value and the second micro-step value, wherein the interpolating is based on the fractional value to generate a fractional micro-step value;

generating a target current value based on the fractional micro-step value, wherein the target current value is suitable for operating the stepper motor.

The following options apply to both the second and third aspects.

Optionally, the stepper motor comprises at least a first motor coil and a second motor coil.

Optionally, the method further comprises adding (e.g., by an adder) the first micro-step value and the fractional micro-step value. Optionally, the target current value is based on the addition of the first micro-step value and the fractional micro-step value.

Optionally, the method further comprises: outputting one micro-step value upon each period of a time rate; and determining one fractional micro-step value, based on a corresponding fractional value upon, each period of the time rate.

Optionally, the addition of the first micro-step value and the fractional micro-step value is performed once per time rate.

Optionally, the method further comprises: outputting one micro-step value upon each period of the first time rate; and determining one fractional micro-step value, based on a corresponding fractional value upon, upon each period of the second time rate. Optionally, the second time rate is a multiple of the first time rate.

Optionally, the addition of the first micro-step value and the fractional micro-step value is performed once per second time rate.

Optionally, the fractional value is a fraction represented by the mathematical expression 1/b, where b is an integer number Optionally, the second time rate is the multiple of b times the first time rate.

Optionally, the method further comprises disconnecting the interpolator output if the velocity of the stepper motor rotor is greater than a velocity threshold.

Optionally, the fractional micro-step value represents a phase angle position between the first phase angle position and the second phase angle position.

Optionally, the micro-step sequencer comprises a look-up table. Optionally, the first micro-step value is in a first row of the look-up table, and the second micro-step value is in a second row of the look-up table. Optionally, the second row immediately follows the first row.

Optionally, the method further comprises receiving, the micro-step sequencer, a signal which increments the position of the quantised waveform.

Optionally, the method further comprises: determining a target current based on the fractional micro-step value; and, operating the stepper motor based on the target current value.

Optionally, the target current value is a vector representing the target current of the first motor coil and the target current of the second motor coil.

Optionally, the quantised waveform is sinusoidal.

Optionally, the interpolating comprises linearly interpolating between the first micro-step value and the second micro-step value to generate the fractional micro-step value.

Optionally, the interpolating comprises filtering the first micro-step value and the second micro-step value to generate the fractional micro-step value.

Optionally, the interpolating comprises a weighted time slot assignment applied to the first micro-step value and the second micro-step value to generate the fractional micro-step value.

The method and circuit arrangement of the above aspects may provide improved positional accuracy, reduced motor resonance, quieter motor operation, while also reducing the implemented die size, reducing the engineering effort to implement the additional nano-steps, reduces overall costs.

FIGURES

FIG. 3A illustrates a graphical representation of a counter which counts to a counter threshold and resets, time is on the x-axis.

FIG. 3B illustrates a graphical representation of square wave signal which toggles to a low or high state in response to the counter threshold of FIG. 3A being reached.

FIG. 7A illustrates a graphical representation of two counters which counts to respective counter thresholds and each reset, time is on the x-axis.

FIG. 7B illustrates a graphical representation of square wave signal which toggles to a low or high state in response to one of the counter thresholds of FIG. 7A being reached.

FIG. 7C illustrates a graphical representation of square wave signal which toggles to a low or high state in response to the other one of the counter thresholds of FIG. 7A being reached.

FIG. 7D illustrates a graphical representation of the step counter position on the y axis, and the time on the x axis, in response to each period of the square wave signals of FIGS. 7B and 7C.

DEFINITIONS

Figure 1:
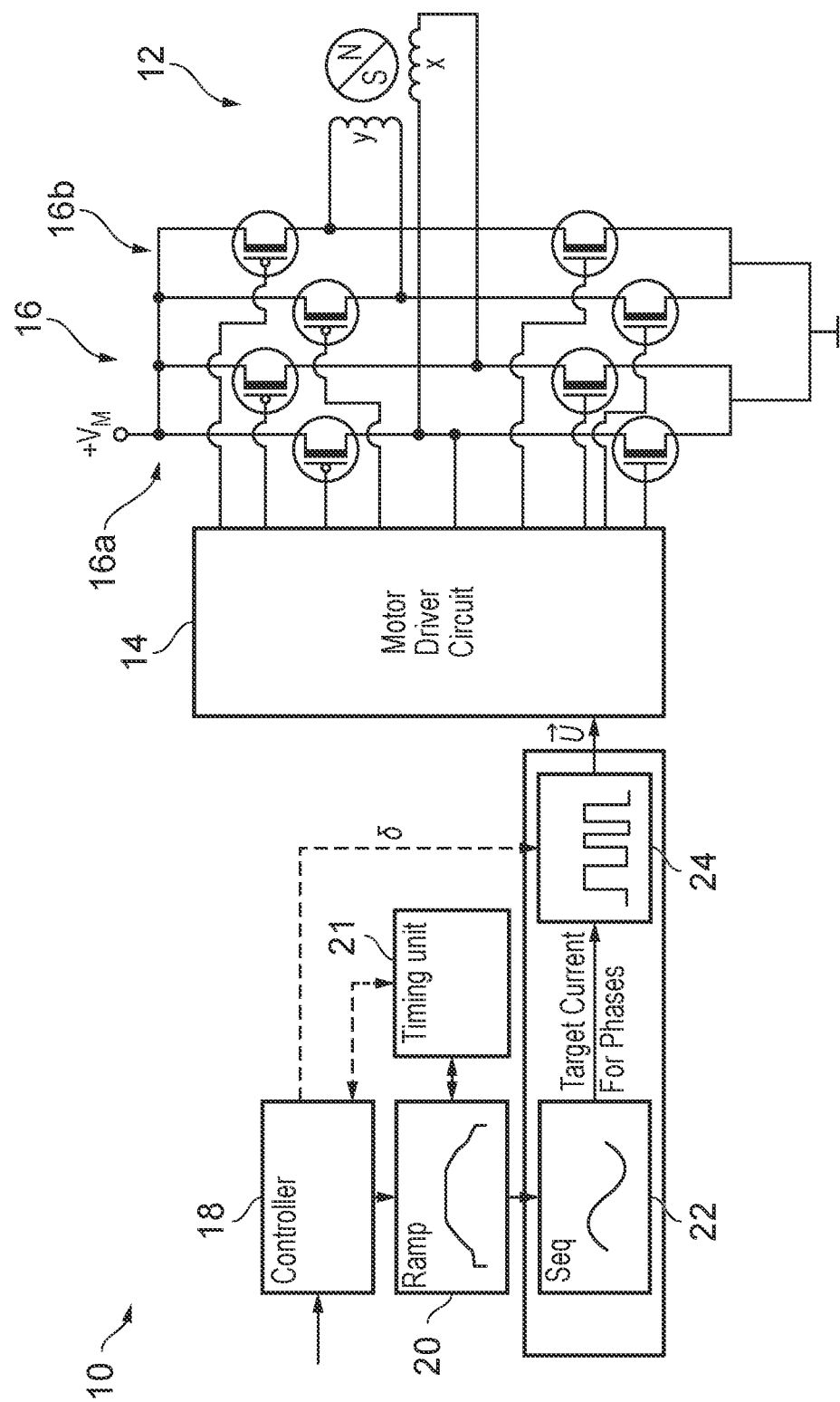
FIG. 1 illustrates a schematic block wiring diagram of a circuit arrangement for operating a stepper motor.

An operating mode with a control loop (i.e., an industrial control loop, or closed loop control) generally includes a process variable sensor for sensing a variable of a process, a controller for receiving an input signal representative of the process variable and for generating an output signal based on the input signal and a setpoint signal representing a desired value of the process variable, and an actuation device for receiving the output signal and for adjusting the process in response to the output signal. The controller uses the control algorithm to compare the setpoint signal to the input signal from the previous iteration of the loop (e.g., at time t=−1) and to generate the output signal for the current iteration of the loop (e.g., at time t=0). The actuation device adjusts the process in order to bring the process variable towards the desired value represented by the setpoint signal, which will be used as the input for the next iteration of the loop (e.g., at time t=1).

The controller may be implemented as a computer program executing on a processor, and the process variable sensor, actuation device, and setpoint input may be connected to the controller via electrical or communication links.

A voltage-based operating mode with a control loop is a control loop operating mode which uses voltage signals to generate a control signal for operating a device. A current-based operating mode with a control loop is a control loop operating mode which uses current signals to generate a control signal for operating a device.

Regulating Involves correcting for an error between the commanded setpoint and the actual value based on some type of feedback. That is, the output of a regulator is determined which, upon a new iteration of a control loop adjusts the actual value to the commanded setpoint.

Operating the stepper motor involves providing a voltage/current to the motor coils of the stepper motor to induce movement in the rotor/stator of the stepper motor.

Over dimensioning is a standard practice in industry in which an oversized (e.g., on the NEMA scale) stepper motor is selected for an industrial/consumer application to ensure compliance.

A mechanical load is the load which is coupled to the stepper motor's rotating element (typically the rotor).

DETAILED DESCRIPTION

Operating a stepper motor in a micro-step mode of operation enables the stepper motor to be able to achieve a higher resolution of positioning, reduces mechanical resonance, and improves the operating efficiency of stepper motors.

A problem with a known micro-step mode of operation of a stepper motor is the high cost, die size, and engineering effort to implement high numbers of micro-steps (i.e., greater than 256 micro-steps per full step). Typically, stepper motor control circuits rarely have greater than 256 micro-steps for this reason.

In addition, some applications that require high resolution can work with an active correction of the position, based on position feedback. This correction can be a closed loop control. The drawback of this closed loop control is, that it requires high resolution feedback and inherently requires a position error for active control, which may lead to oscillation (i.e., hunting oscillation).

Embodiments described herein solve the above problems associated with previous stepper motor control methods.

As a brief non-limiting overview, the present disclosure provides a method of operating a stepper motor in a micro-step mode of operation. The method includes receiving two micro-step values and interpolating between them to generate a fractional micro-step value, which results in a possible stepper motor resolution much greater than provided by the micro-step values alone. This enables improved control over the stepper motor position and motor resonances which can improve control stability and accuracy. Motor resonances can result in oscillations leading to energy losses. Therefore, a prevention of motor resonances can increase efficiency. In addition, the method of the present disclosure thus allows a controller to implement a high number of micro-steps with a reduced cost, reduced die size, and reduced engineering effort when compared to an overall increase in the number of micro-step values within a micro-step sequencer. For example, an additional 256 fractional steps between each micro-step can be provided, thus greatly increasing the potential resolution of a stepper motor.

FIG. 1 shows an example of a schematic block wiring diagram of a circuit arrangement 10. The circuit arrangement 10 shows a stepper motor 12 controlled in a micro-step mode of operation. The stepper motor 12 is controlled with a motor driver circuit 14, for example a voltage chopper. The motor driver circuit 14 generates a drive voltage for each coil of the stepper motor 12, for example the drive voltage may be a pulse width modulation (PWM) voltage for operating the stepper motor 12. The stepper motor 12 may, in addition, be operated with additional control schemes, for example, as part of a control loop.

In a simple case of a 2-phase stepper motor 12 it may be assumed that one of the two coils (e.g., coil x) is subjected to a sinusoidal current course and the other coil (e.g., coil y) is supplied with a current course which is phase-shifted by 90° and thus co-sinusoidal. The stepper motor 12 may also be controlled in micro-step operation with a PWM voltage which results in a substantially sinusoidal motor coil current within the coils x, y. However, the following considerations also apply accordingly in the alternative case of: non-sinusoidal motor coil current; stepper motors with the same or a different number of phases; an associated phase shift of the motor coil currents relative to one another which is not 90°; and/or a stepper motor operated in a full- and a half-step operation.

A PWM voltage may be generated from a motor supply voltage, such that the amplitude of the motor supply voltage defines the amplitude of the PWM voltage. In particular, the motor supply voltage can be pulse-width-modulated and applied with corresponding polarity to the motor coils x, y. The duty factor of this modulation being controlled or regulated in such a way that the resulting effective voltage across the motor coils each has an amount which causes an instantaneous motor coil current value to flow. Alternatively, other methods may be used to cause the instantaneous target motor coil currents value to flow. The control of the PWM may be based on a control signal $\vec{U}$ using known methods.

The circuit arrangement 10 comprises, as components known per se, an integrated motor driver circuit 14, with which first and second bridge circuits 16 are controlled via outputs. The bridge circuits 16 are arranged between a supply voltage +VM and ground, in order to apply in the voltage-based (or voltage-regulated) operating mode a first PWM voltage signal to the coil x and a second PWM voltage signal to the coil. The motor driver circuit 14 receives a control signal $\vec{U}$ from a control signal generation block 24 in order to control the amplitude or the amount of the voltage applied to each coil, or the duty factor of the PWM voltages, e.g., via controller 18 (comprising a regulator, preferably a PI-regulator). Since these motor driver circuit 14 units are known per se, they do not need to be described in more detail. The disclosure is directed towards the generation of the micro-stepped target current signal which generates the control signal $\vec{U}$. The target current signal may be a vector representing the target current of the first motor coil and the target current of the second motor coil.

FIG. 1 shows a ramp generator 20 coupled to a micro-step sequencer 22. The ramp generator 20 is known per se and acts as a pulse generator and/or a position pointer/counter for the micro-step sequencer 22. The ramp generator 20 receives a signal from a timing unit 21 which determines the time rate at which the ramp generator 20 generates a micro-step signal (e.g., a pulse and/or a position pointer/counter) for the micro-step sequencer 22. The ramp generator 20 may comprise the timing unit 21. The ramp generator 20 may receive a target velocity and determine a range of intermediate target velocities in which the stepper motor operates at before the target velocity is reached, this is known as an acceleration ramp.

The micro-step sequencer 22 may be configured to store a plurality of micro-step values in an index table with many steps (e.g., micro-step values) each corresponding to a phase angle position. The micro-step sequencer 22 is operated to sequentially step through each row in the index table in order in response to a signal generated by the ramp generator 20. The index table may be implemented as a look-up-table. Each row of the index table may comprise one or more micro-step values, each associated with a unique motor coil (e.g., coil y, and coil x), respectively. For example, a first micro-step value may be in a first row of the look-up table, a second micro-step value may be in a second row of the look-up table (e.g., the second row immediately following the first row).

When the micro-step sequencer 22 receives a signal generated by the ramp generator 20 and the current position pointer is at the last row in the index table, then the next step is the first row in the index table. That is, the index table of the micro-step sequencer 22 may be stepped through cyclically (i.e., continuously). The operation and function of a micro-step sequencer 22 will be briefly described with reference to FIGS. 2A, 2B, and 2C.

Figure 2A:
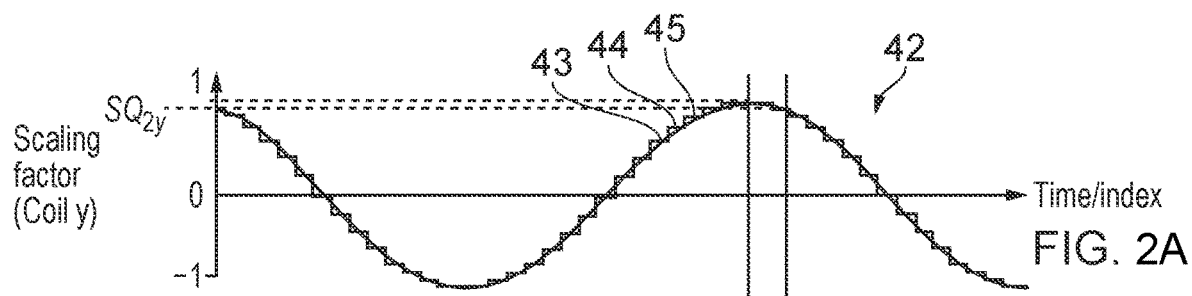
FIG. 2A illustrates a graph of a micro-step sequencer waveform for a first motor coil of the stepper motor.

FIG. 2A shows a first micro-step sequencer waveform 42. The first micro-step sequencer waveform 42 is discrete and comprises many steps. Each step (e.g., 43, 44, 45) represents a micro-step value (e.g., a scaling factor between 1 and −1) at a specific phase angle position (the phase angle position may represent a row in the index table, or a point in time). The first micro-step sequencer waveform 42 may correspond to coil y of the stepper motor 12. The micro-step sequencer 22 may further configured to store a plurality of micro-step values associated with discrete values of the quantised waveform 42 representing motor coil current values of the y coil. Upon receiving a signal, a micro-step value for the coil y (optionally a micro-step vector) may be output sequentially from a micro-step sequencer 22.

Figure 2B:
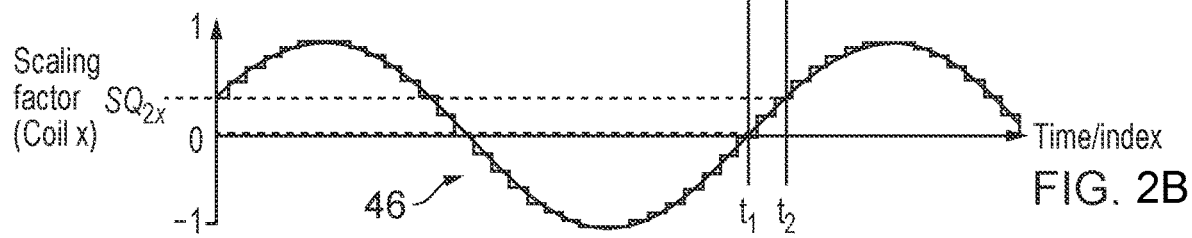
FIG. 2B illustrates a graph of a micro-step sequencer waveform for a second motor coil of the stepper motor.

FIG. 2B shows a second micro-step sequencer waveform 46. The second micro-step sequencer waveform 46 is discrete and comprises many steps. The second micro-step sequencer waveform 46 may correspond to coil x of the stepper motor 12. The second micro-step sequencer waveform 46 may be a phase shifted version of the first micro-step sequencer waveform 42, for example, by 90°. That is, the first and second micro-step sequencer waveforms 42, 46 may have a non-zero phase difference. The first and second micro-step sequencer waveforms 42, 46 may be quantised or continuous. The micro-step sequencer 22 may further configured to store a plurality of micro-step values associated with discrete values of the quantised waveform 46 representing motor coil current values of the x coil. Upon receiving a signal, a micro-step value for the coil x (optionally a micro-step vector) may be output sequentially from a micro-step sequencer 22.

As an example, a first phase angle positions $t_1$ of the first micro-step sequencer waveform 42 corresponds to the first phase angle position $t_1$ of the second micro-step sequencer waveform 46. The first phase angle position $t_1$ represents a point in the index table (or a point in time t=1). Each phase angle position (e.g., $t_1$, $t_2$, etc.) corresponds with a micro-step value (e.g., representing a scale factor). It can be seen that at the first phase angle position $t_1$, a first micro-step value $SQ_{1x}$ for the coil x is 0, and a first micro-step value $SQ_{1y}$ for the coil y is 1. The output of the micro-step sequencer 22 represents a first micro-step vector $\vec{S}_1$ defined by the first micro-step value $SQ_{1x}$ of the first micro-step sequencer waveform 42 and first micro-step value $SQ_{1y}$ of the second micro-step sequencer waveform 46. A first control signal $\vec{U}_1$ may be based on a first micro-step value $SQ_{1x}$ associated with a first phase angle position $t_1$ of the first micro-step sequencer waveform 42 for operating the stepper motor 12 in a micro-step mode of operation.

Similarly, a second phase angle position $t_2$ of the first and second micro-step sequencer waveforms 42, 46 represents a point in the index table (or a point in time t=2). The second control signal $\vec{U}_2$ may be based on a second micro-step value $SQ_{2x}$ associated with a second phase angle position $t_2$ of the micro-step sequencer waveform for operating the stepper motor 12 in a micro-step mode of operation.

Figure 2C:
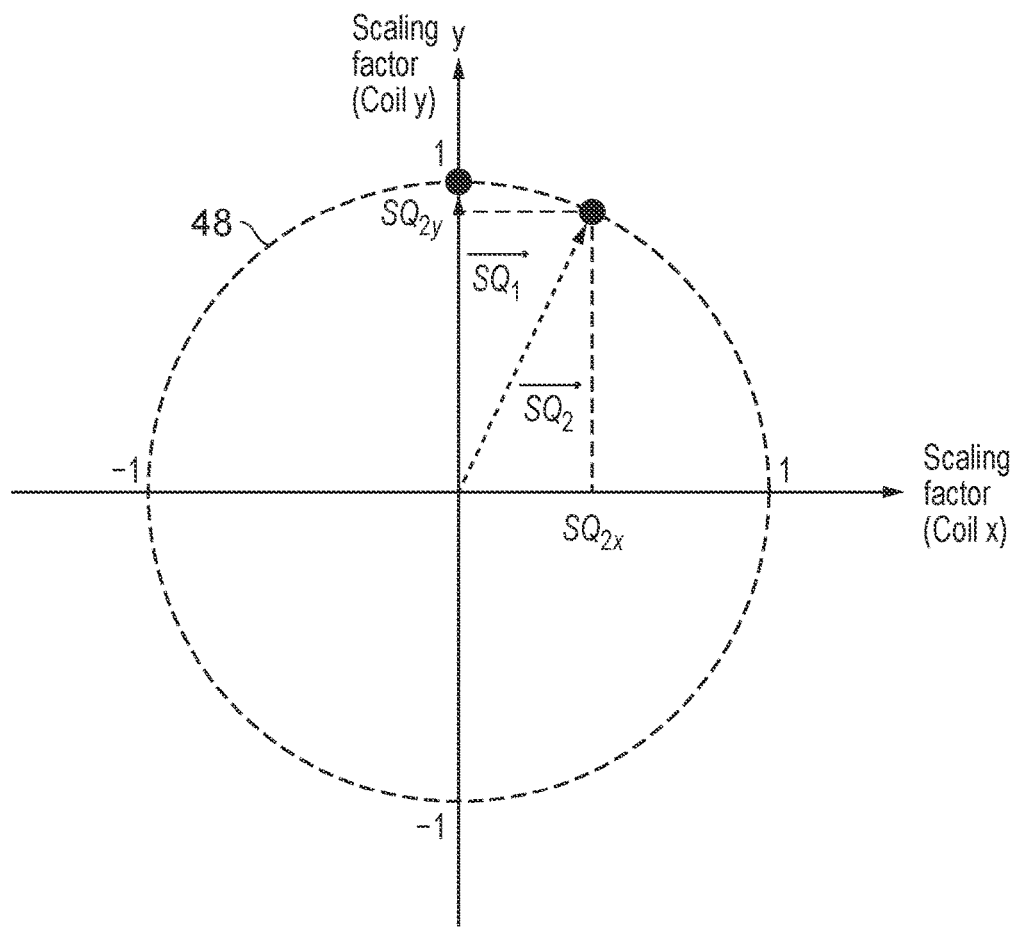
FIG. 2C illustrates a graph of the relationship between the two micro-step sequencer waveforms of FIGS. 2A and 2B.

FIG. 2C shows a graphical representation of the first and second micro-step vectors $\vec{SQ}_1$, $\vec{SQ}_2$ on a graph with an x-axis representing the second micro-step sequencer waveform 46, and a y-axis representing the first micro-step sequencer waveform 42.

Each of the first and second micro-step vectors $\vec{SQ}_1$, $\vec{SQ}_2$ may be determined based on: a micro-step value (e.g., $SQ_{1x}$, $SQ_{2x}$) associated with the second micro-step sequencer waveform 46; and a micro-step value (e.g., $SQ_{1y}$, $SQ_{2y}$) associated with the first micro-step sequencer waveform 42. There is a predetermined (e.g., by the micro-step sequencer) phase angle relationship between the first micro-step sequencer waveform 42 and a second micro-step sequencer waveform 46. The phase angle relationship between the first micro-step sequencer waveform 42 and the second micro-step sequencer waveform 46 is represented by the shape of a dashed circle 48.

As an example, the absolute value of the first micro-step vector is 1 since the magnitude of the first and second micro-step sequencer waveforms 42, 46 represent a scale factor between −1 and 1. A first micro-step phase angle $\angle SQ_1$ represents the angle between the first micro-step vector $\vec{SQ}_1$ and a pre-defined reference angle (this may correspond to the pre-defined reference angle discussed at FIG. 2B). For example, the pre-defined reference angle may be 0°, or any other pre-determined angle. Thus, the first micro-step vector $\vec{SQ}_1$ is defined by the absolute value 1 (i.e., the maximum of the first waveform 42) and the first micro-step phase angle $\angle SQ_1$. Alternatively, the first micro-step phase angle $\angle SQ_1$ may be calculated based on the first and second micro-step values $SQ_{1x}$, $SQ_{1y}$, using an ATAN2 function. The second micro-step vector $\vec{SQ}_2$ may be similarly calculated.

The micro-step sequencer 22 output (generally referred to as SQ) can be applied to an optional signal δ generated by the controller 18, at the control signal generation block 24 which generates the control signal $\vec{U}$. The signal δ may be a scalar signal. The signal $\delta_1$ at a time t=1 may be multiplied by the micro-step sequencer output 22 output $SQ_1$ (e.g., with a multiplier) to generate a first control signal $\vec{U}_1$. Therefore, the first control signal $\vec{U}_1$ may be a vector. Similarly, the signal $\delta_2$ at a time t=2 may be multiplied by the micro-step sequencer 22 output $\vec{SQ_2}$ (e.g., with a multiplier) to generate the second control signal $\vec{U}_2$. That is, the second control signal $\vec{U}_2$ may be a coil control vector which may be defined by the signal $\delta$, and at least two of: (i) the predetermined (e.g., by the micro-step sequencer) phase angle relationship between the first micro-step sequencer waveform and a second micro-step sequencer waveform (e.g., the shape of the dashed circle 48 in FIG. 2C); (ii) the second micro-step value $SQ_{2x}$ associated with the second micro-step sequencer waveform 46; and (iii) the second micro-step value $SQ_{2y}$ associated with the first micro-step sequencer waveform 42.

The micro-step sequencer 22 may generate an output which only represents a single stepper motor coil (e.g., coil x). That is, the micro-step sequencer 22 may comprise a micro-step values associated with discrete values of a single micro-step sequencer waveform. Additional circuitry may be present to output micro-step values associated with a different stepper motor coil (e.g., coil y). The micro-step values associated with a different stepper motor coil (e.g., coil y) may be generated based on generated micro-step values of the micro-step sequencer 22 (e.g., associated with coil x).

FIGS. 3A and 3B show a graphical representation of the generation of a micro-step signal for the micro-step sequencer 22. As described above, the ramp generator 20 receives a signal from a timing unit 21 which determines the time rate at which the ramp generator 20 generates a micro-step signal (e.g., a pulse and/or a position pointer/counter) for the micro-step sequencer 22. That is, the timing unit 21 may set a clock signal and provide a counter threshold $N_\mu$. The ramp generator 20 may receive both the clock signal and the counter threshold $N_\mu$.

FIG. 3A shows a graphical representation of a counter which increments by a step upon determining a period of the clock signal has occurred. The counter increments until the counter value reaches a counter threshold $N_\mu$, then the counter resets. Upon determining that the counter threshold $N_\mu$ has been reached a micro-step signal is toggled from high to low, or low to high as shown in FIG. 3B. The micro-step sequencer 22 may then generate an output upon determining a period $T_\mu$ of the micro-step signal has occurred. The description of clock signals generating micro-step signals is only a single example, and it would be understood that other possible methods for generating the micro-step signal are possible and known per se, they do not need to be described in more detail.

The counter threshold $N_\mu$ may be actively determined (i.e., programmable) by the ramp generator 20 or controller 18. For example, the ramp generator 20 or controller 18 may define the counter threshold $N_\mu$ as result of an acceleration ramp towards a target velocity. That is, the counter threshold $N_\mu$ defines the step frequency $$(\frac{1}{T_\mu},$$

as shown in FIG. 3B) for a given system clock, and therefore the velocity of the stepper motor 12.

Figure 4:
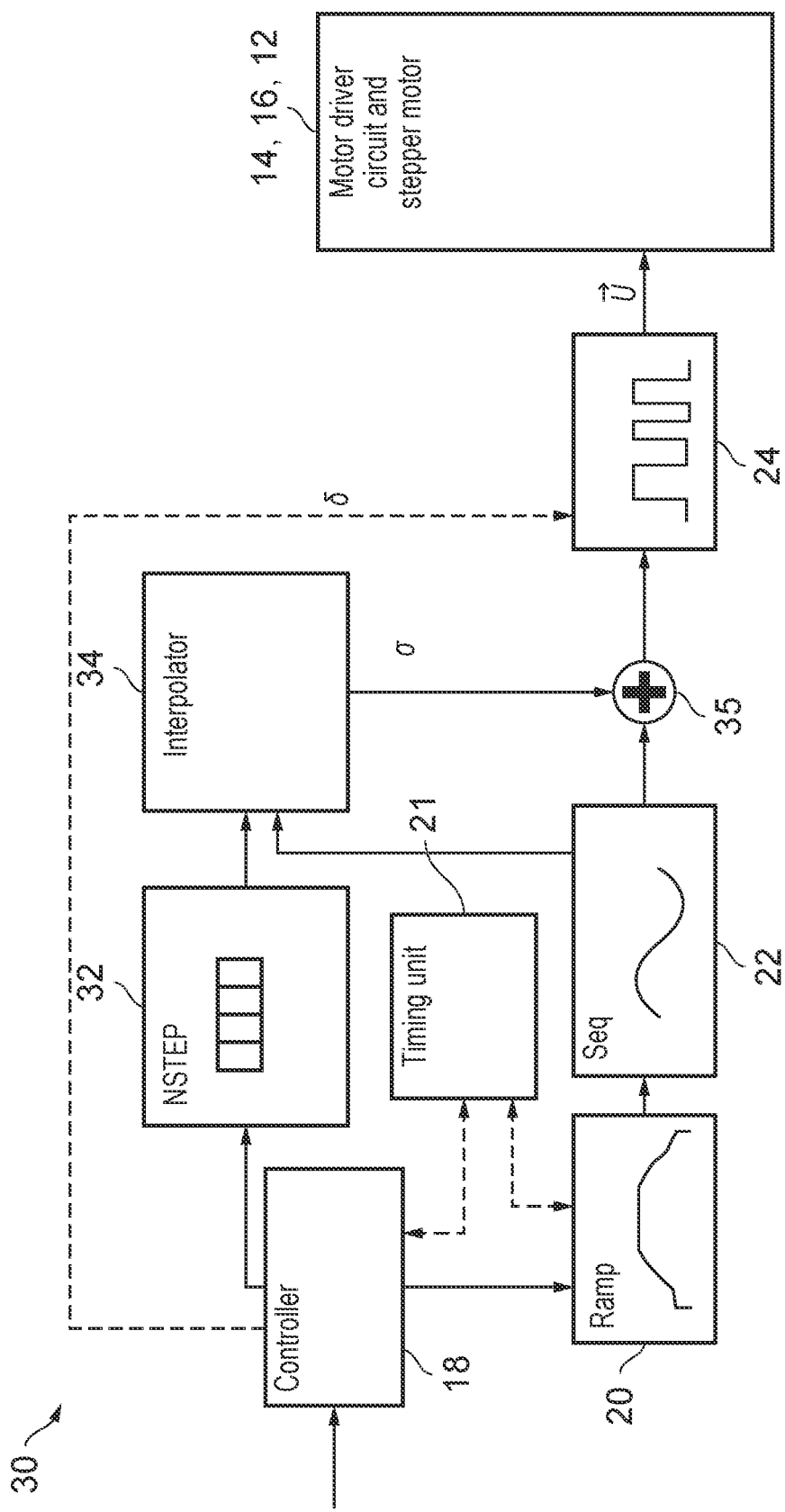
FIG. 4 illustrates an additional schematic block wiring diagram of a circuit arrangement for operating a stepper motor with optional features.

FIG. 4 shows an example of a schematic block wiring diagram of a circuit arrangement 30 for carrying out the method. FIG. 4 also shows how each block relates to method steps. The circuit arrangement 30 shows all of the features of schematic block wiring diagram of a circuit arrangement 10 of FIG. 1, in addition to certain optional features. The same reference numerals are used to denote the same/corresponding features in relation to FIG. 1 and will not be described in detail again below.

The circuit arrangement 30 is for operating the stepper motor 12 controlled in a micro-step mode of operation. The circuit arrangement 30 comprises a nano-step register 32, and an interpolator 34. The micro-step sequencer 22 is configured to store and output a plurality of micro-step values associated with discrete values of the quantised waveform 42. The micro-step sequencer 22 is coupled to the input of the interpolator 34 and the interpolator 34 is configured to output a plurality of fractional micro-step values comprising at least: a first micro-step value associated with a first phase angle position of the quantised waveform 42; and a second micro-step value associated with a second phase angle position of the quantised waveform 42. Preferably the first and second micro-step values are provided from sequential rows of the index table.

The nano-step register 32 is configured to store one or more fractional values and output them to the interpolator 34. As an example, a nano-step register may store 256 fractional values. Fractional values may correspond to fractions such as a/2, a/3, a/4, a/5, a/b, etc., where a and b are integer numbers. The fractional values represent a fraction between the first micro-step value and the second micro-step value. For example, if the nano-step register 32 stores a single fractional value=½, then it may be of size 1, or it may store two fractional values=0/2, and ½, then it may be of size 2 (the later provides a signal [corresponding to 0/2], that the value from only the micro-step sequencer is desired). In another example, if the nano-step register 32 stores a plurality of fractional values such as 0/4, ¼, 2/4, ¾, then it may be of size 4. The nano-step register 32 may be configured by the controller 18 to output one of the one or more fractional values stored (for operating the stepper motor 12 to a target position), or It may be configured to sequentially and cyclically output all of the values to the interpolator 34 when signalled by the timing unit 21 (for operating the stepper motor to a target position and/or at a target velocity).

As shown in FIG. 4, the interpolator 34 is coupled to outputs of the micro-step sequencer 22 and the nano-step register 32. The interpolator 34 is also coupled to the input of the control signal generation block 24 optionally via an adder 35. The interpolator 34 is configured to receive: the first micro-step value and the second micro-step value from the micro-step sequencer 22; and a fractional value from the nano-step register 32. Functionally, the interpolator 34 is configured to interpolate, between the first micro-step value and the second micro-step value, based on the fractional value (as will be described below). The output of the interpolator 34 may be a fractional micro-step value which represents an offset a which may be applied to the first micro-step value via the adder 35. The control signal generation block 24 may generate a signal (e.g., a target current) which is used by the motor driver circuits 14, 16 to operate the stepper motor 12.

When the stepper motor 12 is operated to a target position (between discrete micro-step positions defined by the micro-step sequencer 22), the stepper motor 12 may be stepped forward in micro-steps and an offset σ may be added to each micro-step. The offset σ is defined by the nano-step register 32 and the first and second micro-step values (i.e., the preceding micro-step and the next micro-step). This method allows the stepper motor 12 to stop at a target position between the first and second micro-step positions defined by the fractional micro-step value.

Figure 5:
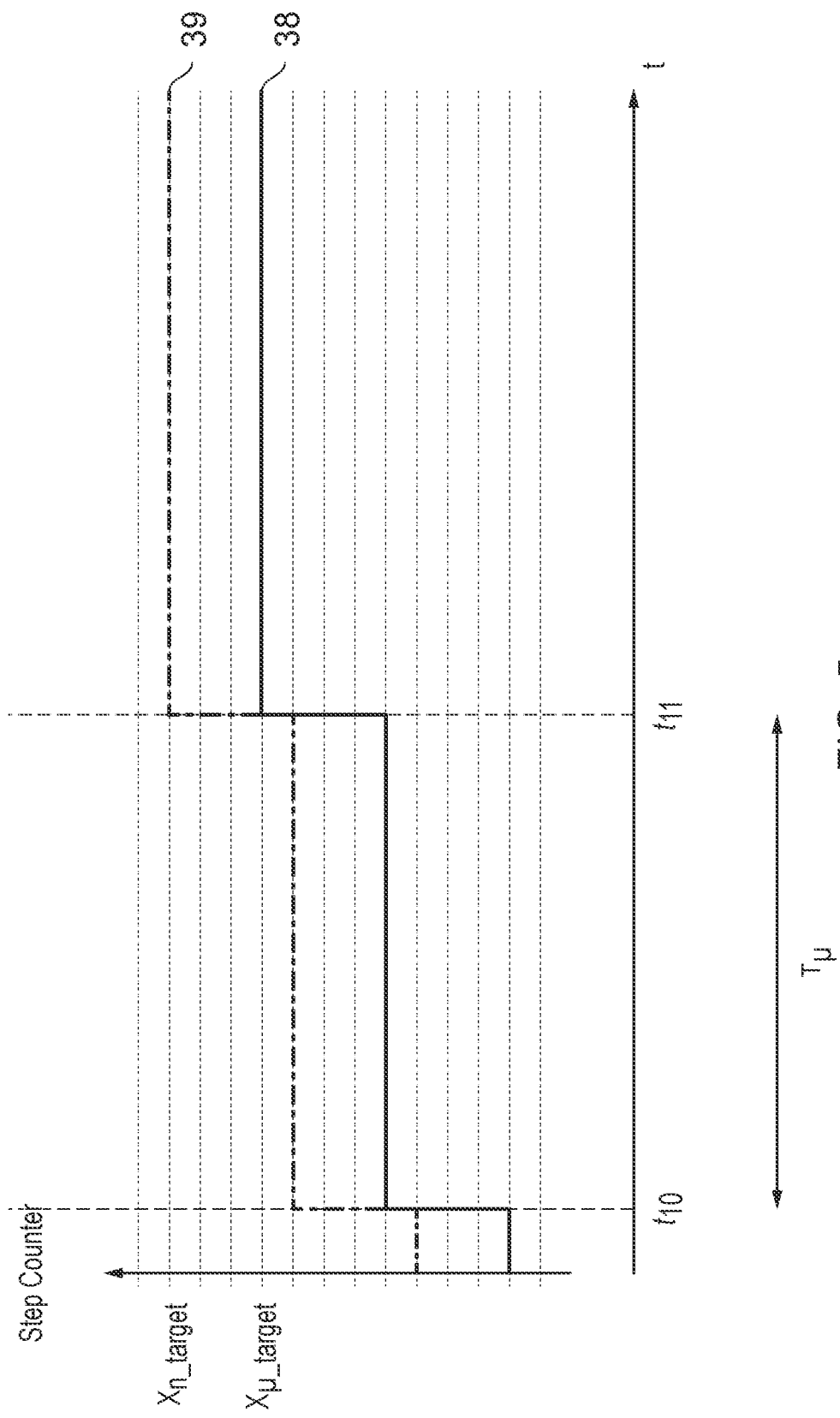
FIG. 5 illustrates a graphical representation of the step counter position on the y axis, and the time on the x axis.

As explained above, the micro-step sequencer 22 is operated to sequentially step through each row in an index table comprising micro-step values. Each row may be called a step, and a step counter may record the current step position. FIG. 5 shows a graphical representation of the step counter position on the y axis, and the time on the x axis. The step counter position may correspond to the rotational position of the stepper motor 12 when operated. The time on the x axis corresponds to the time period shown in FIGS. 3A and 3B because at each period $T_\mu$ of the micro-step signal, the step counter position is incremented. The step counter position output from the micro-step sequencer 22 is shown as a solid line 38. The dashed line 39 shows the fractional value superimposed on top of the step counter position (the solid line 38). The fractional value in the example of FIG. 5 is ¾, and FIG. 5 shows that the step counter position can be set between the fixed step counter positions which are output from the micro-step sequencer 22. Thus, by selecting a fractional value as an offset, the stepper motor can be operated to rotate the rotor to a target rotor position which is greater than the accuracy afforded by the micro-step sequencer 22 alone. Advantageously, with only minimal additional circuitry the stepper motor may be operated to achieve a fourfold increase in rotor position accuracy.

That is, the micro-step sequencer 22 may be configured to receive the micro-step signal which increments the position of the quantised waveform (i.e., the row of the look-up table) at each period $T_\mu$ of the micro-step signal. The micro-step sequencer 22 may then be configured to output one micro-step value upon each period $T_\mu$ of the time rate. The interpolator 34 may also be configured to determine one fractional micro-step value, based on a corresponding fractional value, upon each period $T_\mu$ of the time rate. The period $T_\mu$ may be defined by a cycle of one high and one low phase (e.g., of a square wave).

Figure 6:
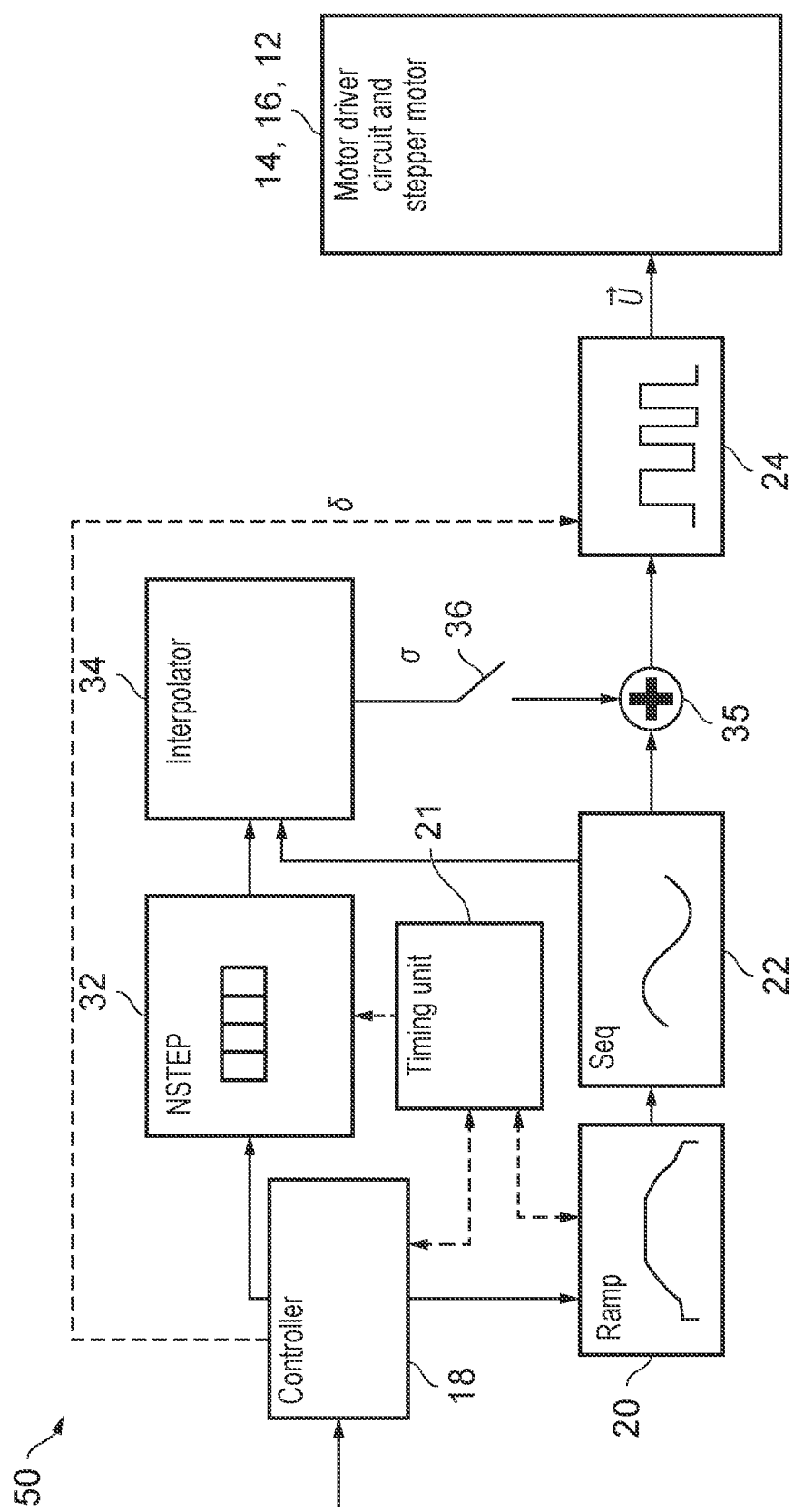
FIG. 6 illustrates an additional schematic block wiring diagram of a circuit arrangement for operating a stepper motor with optional features.

FIG. 6 shows an example of a schematic block wiring diagram of a circuit arrangement 50 for carrying out the method. FIG. 6 also shows how each block relates to method steps. The circuit arrangement 50 shows all of the features of schematic block wiring diagram of a circuit arrangement 30 of FIG. 4, in addition to certain optional features. The same reference numerals are used to denote the same/corresponding features in relation to FIG. 4 and will not be described in detail again below. The circuit arrangement 50 comprises an optional switch 36. In addition to operating the stepper motor 12 to improve positional accuracy (with reference to FIGS. 4 and 5), the circuit arrangement 50 may provide a reduction in stepper motor resonance, and improved stepper motor efficiency when operating the stepper motor 12 at a target velocity.

The timing unit 21 comprises an additional output to the nano-step register 32. The timing unit 21 determines a first time rate (output to the ramp generator 20) and a second time rate (output to the nano-step register 32, or the interpolator 34).

Figures 7A, 7B, 7C, 7D:
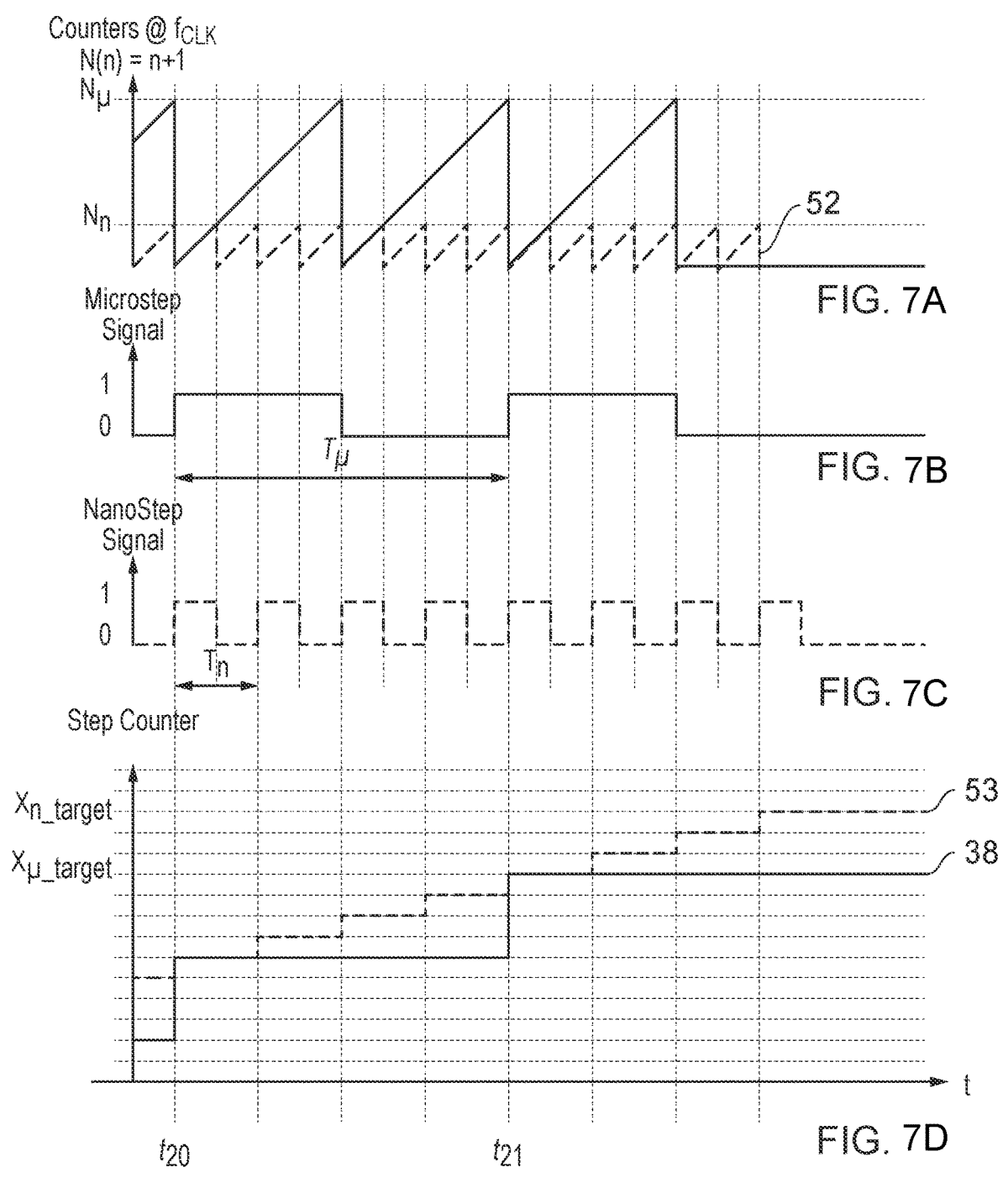

FIGS. 7A and 7B show a graphical representation of the generation of a micro-step signal for the micro-step sequencer 22 similar to FIGS. 3A and 3B. As described above, the timing unit 21 may set a clock signal and provide a counter threshold $N_\mu$. The ramp generator 20 may receive both the clock signal and the counter threshold $N_\mu$, or the ramp generator 20 may receive the clock signal and determine the counter threshold $N_\mu$ based on a target velocity. FIG. 7A also shows a graphical representation of the generation of a nano-step signal 52 (shown by dashed line 52) for the nano-step register 32. Similarly, the timing unit 21 may set a clock signal and provide a second counter threshold $N_n$. The nano-step register 32 and/or the interpolator 34 may receive both the clock signal and the second counter threshold $N_n$.

$N_\mu$ may represent the number of counter increments per half period $T_\mu$. $N_n$ may represent the number of counter increments per half period $T_n$. The frequency of period $T_\mu$ may be:

$$\frac{f_{clk}}{2*N_\mu}$$

The frequency of period $T_n$ may be:

$$\frac{f_{clk}}{2*N_n}$$

FIG. 7A shows a graphical representation of two counters which increment by a step upon determining a period of the clock signal has occurred. The first counter increments until the counter value reaches a first counter threshold $N_\mu$, then the first counter resets. The second counter (shown by a dashed line 52) Increments until the counter value reaches a second counter threshold $N_n$, then the second counter resets. Upon determining that the second counter threshold $N_n$ has been reached, a nano-step signal is toggled from high to low, or low to high as shown in FIG. 7C.

The nano-step register 32 may then generate an output upon determining a period $T_n$ of the nano-step signal has cycled. The description of clock signals generating nano-step signals is only a single example, and it would be understood that other possible methods for generating the nano-step signal are possible and known per se, they do not need to be described in more detail.

The second counter threshold $N_n$ may be actively determined by the controller 18 (similar to the active determination of the first counter threshold $N_\mu$) or set to be a fraction of the first counter threshold $N_\mu$. $N_n$ is a desired value that may be defined by a velocity profile, which may be generated by the ramp generator 20. Therefore, to maintain a continuous movement, given that the fractional micro-steps are equidistant, $N_\mu$ is a multiple of $N_n$. In a preferred example, the fractional value may be a fraction represented by the mathematical expression a/b, where a and b may be integer numbers, and b may be greater than or equal to a. The second time rate is a multiple of b times the first time rate. The first counter threshold $N_\mu$, is a multiple of b times the second counter threshold $N_n$.

The stepper motor 12 may be operated to a target position (between discrete micro-step positions defined by the micro-step sequencer 22) and/or at a target velocity (to reduce motor resonances). For example, the stepper motor 12 may be operated to a target position (this produces the same result as the method described at FIG. 5), however, this movement is executed in smaller discrete steps (determined by the fractional values stored in the nano-step register 32). Thus, the stepper motor 12 may be operated to continuously step forward with fractional micro-steps and stop at the respective fractional micro-step defined by the nano-step register 32.

FIG. 7D shows a graphical representation of the step counter position on the y axis, and the time on the x axis. The step counter position may correspond to the rotational position of the stepper motor 12 when operated. The time on the x axis corresponds to the time period shown in FIGS. 7A to 7C because at each of the periods $T_\mu$, $T_n$, the step counter positions are incremented, respectively. The micro-step counter position output from the micro-step sequencer 22 is shown as the solid line 38. The dashed line 53 shows the fractional value positions superimposed on top of the micro-step counter position (i.e., the solid line 38). The fractional value positions in the example of FIG. 7D are $$\frac{0}{4}, \frac{1}{4}, \frac{2}{4}, \text{ and } \frac{3}{4}.$$

FIG. 7D shows that the step counter position can be set between the fixed micro-step counter positions. In addition, FIG. 7D also shows a finer granularity of step counter positions resulting in smoother stepper motor motion. Thus, by generating fractional values as an offset at a time period $T_n$, the stepper motor 12 can be operated to a target rotor position which is greater than the accuracy afforded by the micro-step sequencer 22 alone, and the stepper motor 12 may be operated with reduced motor resonances (especially at lower speeds). Advantageously, with only minimal additional circuitry the stepper motor may be operated to achieve a fourfold increase in rotor position accuracy and a smoother operation.

The micro-step sequencer 22 may be configured to output one micro-step value upon each period $T_\mu$ of the first time rate. The interpolator 34 may also be configured to determine one fractional micro-step value, based on a corresponding fractional value, upon each period $T_n$ of the second time rate. The period (either $T_\mu$ and/or $T_n$) may be defined by a cycle of one high and one low phase (e.g., of a square wave).

FIG. 6 further comprises an optional switch 36 which disconnects the interpolator 34 output if the velocity of the stepper motor rotor is greater than a velocity threshold. The switch 36 may disconnect the interpolator 34 if the interpolator 34 provides outputs which are at unsupported or undesired high update rates e.g., when the output frequency of the interpolator 34 is higher than the PWM frequency for operating the stepper motor 12 (this may interfere with the current control or related features). Depending on the stepper motor size, at higher rotational velocities, the inertia of the stepper motor itself may provide sufficient reduction in motor resonances and provide a smooth operation. As such, the switch 36 provides an option to disengage the additional circuitry shown in FIG. 6 to eliminate or reduce interpolation processing. In an example, the switch 36 may close at a frequency to allow a subset of interpolator outputs 34 to progress to the control signal generation block 24. An additional optional switch may be also activated to switch between the positional operation described at FIG. 4, and the positional and velocity operation described at FIG. 6.

Figure 8:
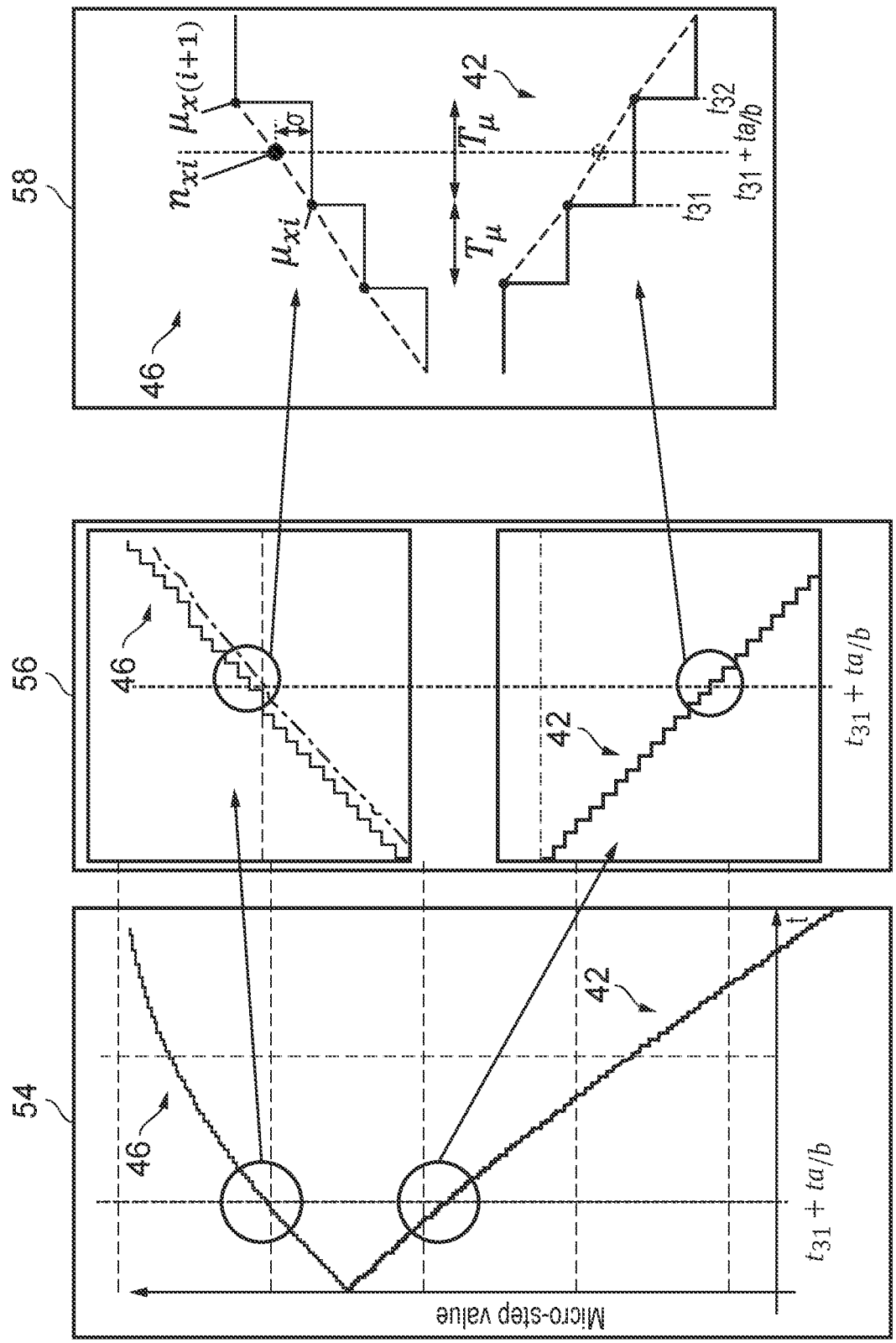
FIG. 8 illustrates a graphical representation of multiple output values of the micro-step sequencer, with an x-axis representing time, and a y-axis representing the micro-step values.

FIG. 8 shows multiple output values of the micro-step sequencer 22 plotted on a graphical representation with an x-axis representing time, and a y-axis representing the micro-step values. That is, FIG. 8 shows a portion of first and second micro-step sequencer waveforms 42, 46 (shown in FIGS. 2A, 2B). The micro-step values can be received by the control signal generation block 24 to generate a target current signal. The target current signal may be determined based on the fractional micro-step value and the stepper motor 12 may be operated based on the target current signal.

FIG. 8 shows the portion of first and second micro-step sequencer waveforms 42, 46 within each section 54, 56, 58. The first micro-step sequencer waveforms 42 represent the micro-step values for the y coil (i.e., first micro-step sequencer waveform 42 of FIG. 2A). The second micro-step sequencer waveforms 46 represent the micro-step values for the x coil (i.e., second micro-step sequencer waveform 46 of FIG. 2B). The portion of first and second micro-step sequencer waveforms 42, 46 show the micro-steps generated by the micro-step sequencer 22. It will be understood that the waveforms shown at FIG. 8 are a representation, and that the output may be represented by micro-step vectors as described with reference to FIG. 2C. Section 56 shows a zoomed-in subsection of section 54. Section 58 shows a zoomed-in subsection of section 56.

The interpolator 34 interpolates between a first micro-step value $\mu_{xi}$ and a second micro-step value $\mu_{x(i+1)}$ based on a fractional value a/b, to generate a fractional micro-step value $n_{xi}$. The output of the interpolator 34 (i.e., based on the fractional micro-step value $n_{xi}$) may be an offset value $\sigma$ which is added (via the adder 35) to the micro-step values $\mu_{xi}$ to be input into the control signal generation block 24. Alternatively, the output of the interpolator 34 may be a fractional micro-step value suitable for being suppled directly to the control signal generation block 24.

Within section 58 it can be seen that at least two micro-steps occur over two micro-step time periods $T_\mu$. Time $t_{31}$ represents a time halfway $$(\text{i.e., } t_{31} + t_{\tfrac{a}{b}},$$

where a=1, and b=2) between the first and second micro-step values $\mu_{xi}$ and $\mu_{x(i+1)}$, respectively. The interpolator 34 is configured to receive the first micro-step value $\mu_{xi}$ and the second micro-step value $\mu_{x(i+1)}$ from the micro-step sequencer 22, and a fractional value from the nano-step register 32. In the example of FIG. 8, the fractional value is ⅔ (at time $t_{31}$).

The interpolator 34 may be any type of interpolator, for example, as shown in FIG. 8, the offset value a is generated by a linear interpolation. A linear interpolation determines a straight line between the first micro-step value $\mu_{xi}$ and the second micro-step value $\mu_{x(i+1)}$ and the fractional micro-step value $n_{xi}$ is a value on the straight line which is a/b (where a is less than or equal to b) between the x-axis value of $\mu_{xi}$ (i.e., $t_{31}$) and $\mu_{x(i+1)}$(i.e., $t_{32}$). Although, other types of interpolation calculation are possible such as a weighted time slot assignment or by filtering. Advantages of applying a linear interpolation include at least: jitter free stepper motor operation; optimisation of stepper motor control with reduced die space, cost, and design effort.

Figure 9B:
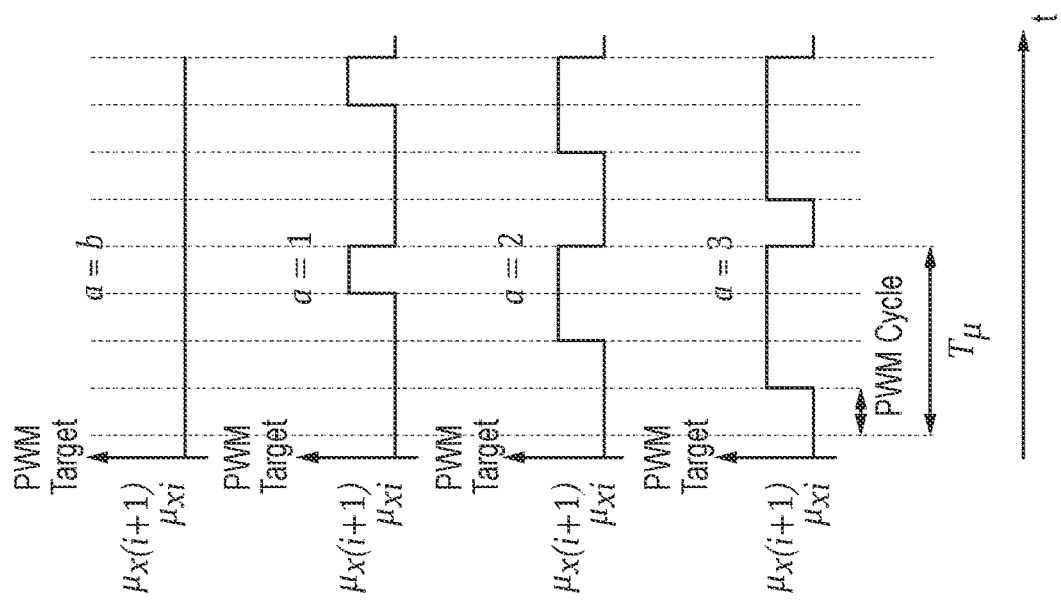
FIG. 9B illustrates a graphical representation of a fractional micro-step value (i.e., an offset) generated by a weighted time slot assignment applied to the first micro-step value and the second micro-step value.
Figure 9A:
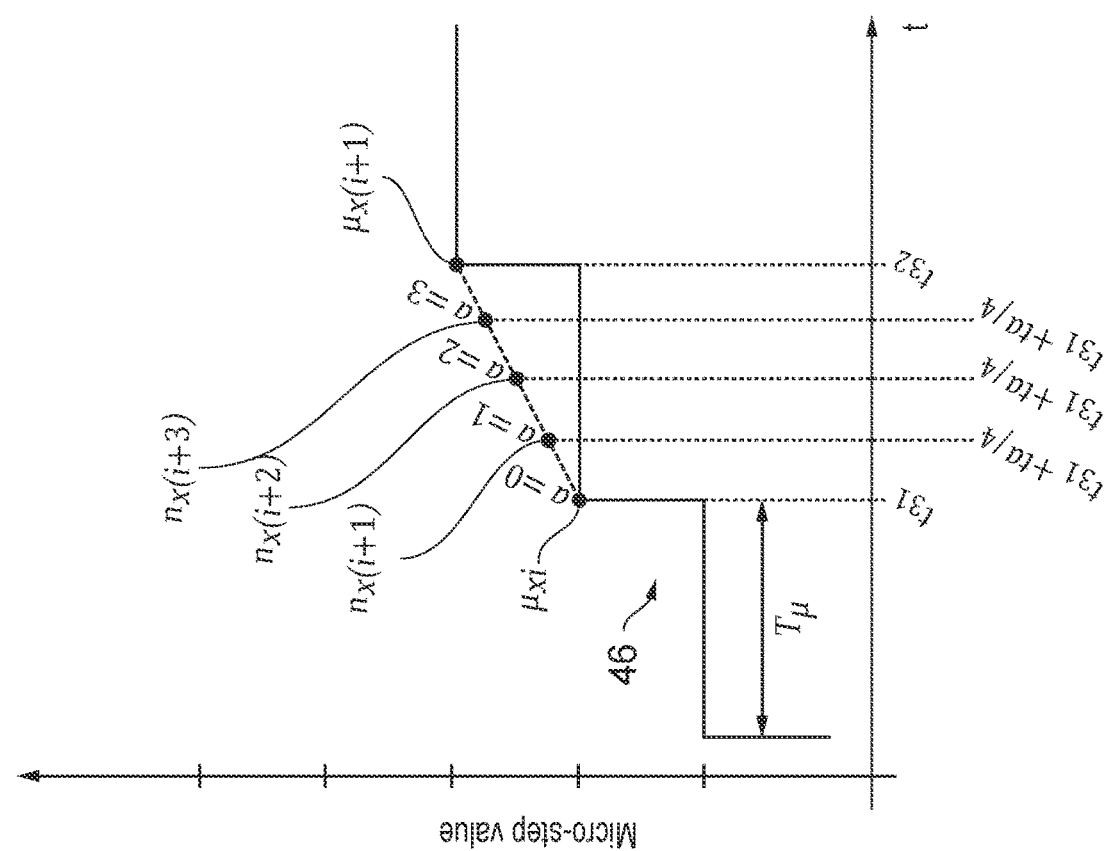
FIG. 9A illustrates multiple output values of the micro-step sequencer and a nano-step register plotted on a graphical representation with an x-axis representing time, and a y-axis representing the micro-step values.

FIG. 9A shows multiple output values $\mu_{xi}$, $\mu_{x(i+1)}$ of the micro-step sequencer 22 plotted on a graphical representation with an x-axis representing time, and a y-axis representing the micro-step values, similar to section 58 from FIG. 8. FIG. 9A shows multiple fractional micro-step values $\mu_{xi}$, $n_{x(i+1)}$, $n_{x(i+2)}$, $n_{x(i+3)}$ (corresponding to fractional values:

$$\frac{0}{4}, \frac{1}{4}, \frac{2}{4}, \text{ and } \frac{3}{4},$$

respectively).

FIG. 9B shows a graphical representation of a fractional micro-step value (i.e., an offset) generated by a weighted time slot assignment applied to the first micro-step value $\mu_{xi}$ and the second micro-step value $\mu_{x(i+1)}$. The fractional micro-step value may be a PWM signal between $\mu_{xi}$ and $\mu_{x(i+1)}$ which results in a substantially similar effect on the stepper motor 12 as described above with the linear interpolation. The PWM cycle is defined by the denominator of the fraction represented by the mathematical expression a/b which is used to generate the fractional value. Advantages of applying a weighted time slot assignment include at least: that PWM resolution suitable for standard micro-stepping is sufficient to implement the fractional micro-stepping method; both periods $T_\mu$, $T_n$ may be synchronous to the PWM generation, thus a simplified timing unit 21 may be implemented; optimisation of stepper motor control with reduced die space, cost, and design effort.

Although fractional values correspond to a PWM cycle of ¼ in the example above, any fractional values corresponding to a PWM cycle of 1/b may be used, where b is any integer number.

The interpolator 34 may be a single type of interpolator, such as linear, filter, weighted time slot assignment, etc. Alternatively, the interpolator 34 may implement a combination of multiple interpolation techniques (such as linear, filter, weighted time slot assignment, etc.) depending on the use case of the stepper motor 12.

In FIGS. 1, 4, 6, the circuit arrangements 10, 30, 50 respectively may be integrated as part of an integrated circuit (IC). Alternatively, the circuit arrangements 10, 30, 50, may be split up such that some components may be added to an external motion controller.

Figure 10:
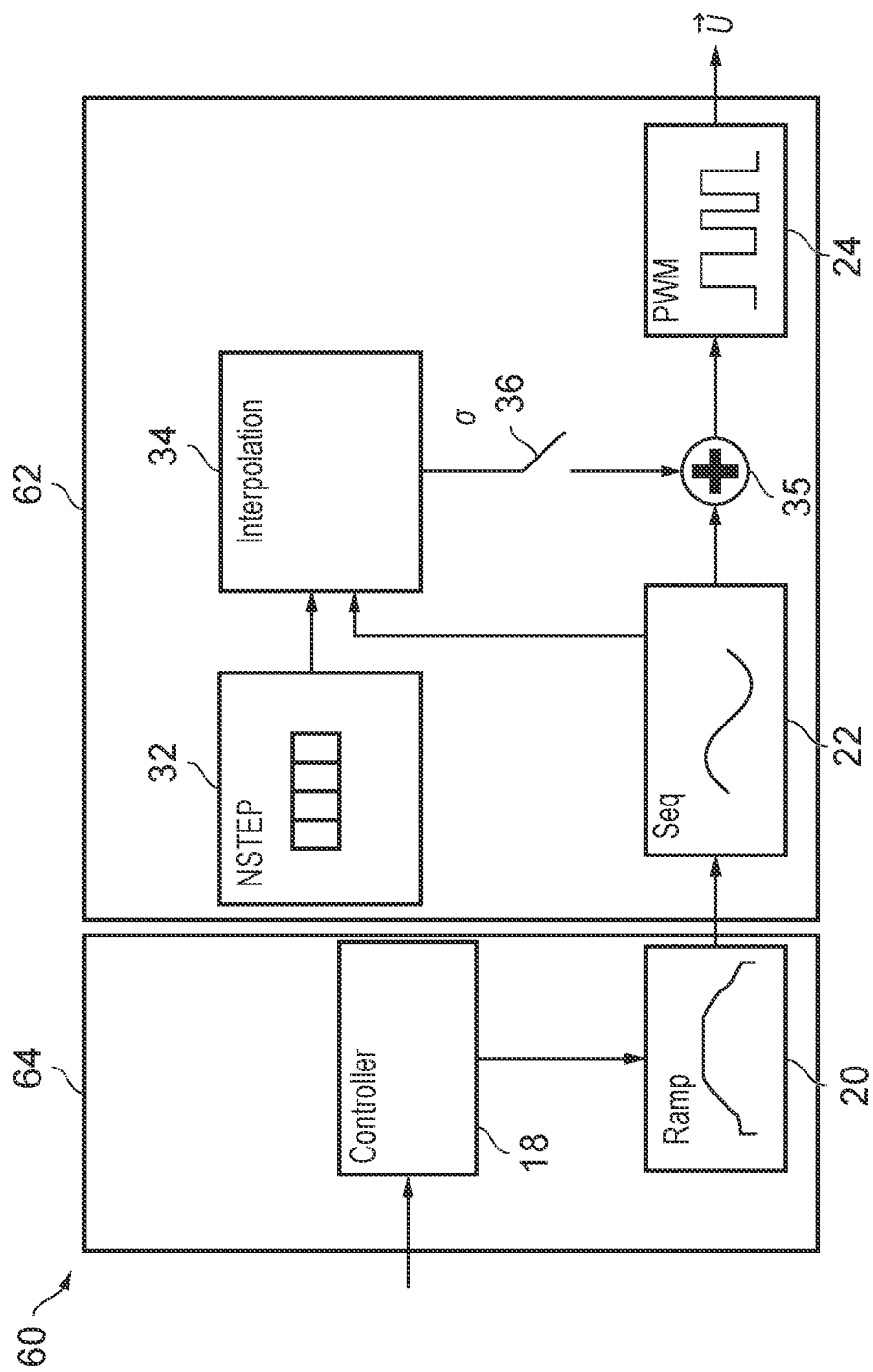
FIG. 10 illustrates an additional schematic block wiring diagram of a circuit arrangement with an external motion controller for operating a stepper motor with optional features.

FIG. 10 shows an example of a schematic block wiring diagram of a circuit arrangement 60 for carrying out the method. FIG. 10 also shows how each block relates to method steps. The circuit arrangement 60 shows all of the features of schematic block wiring diagram of a circuit arrangement 30 of FIG. 4 and a circuit arrangement 50 of FIG. 6, in addition to certain optional features. The same reference numerals are used to denote the same/corresponding features in relation to FIGS. 4 and 6 and will not be described in detail again below. The circuit arrangement 60 is separated into a first circuit arrangement 62 and an external motion controller circuit arrangement 64. The external motion controller circuit arrangement 64 may be a known arrangement which comprises components similar to the controller 18 and ramp generator 20 of FIG. 1. When the stepper motor 12 is operated to a target position, the interpolator 34 may be operated to determine a fractional micro-step value with each received micro-step signal from the ramp generator 20, or with each received micro-step sequencer 22 output (depending on the circuit configuration). When the stepper motor 12 is operated at a target velocity, the interpolator 34 may be modified to determine an estimate of the micro-step period $T_\mu$ from a sequencer of received micro-step values, the interpolator 34 may then determine a fractional micro-step period $T_n$. The interpolator 34 may poll (i.e., request) the next value of the nano-step register 32 upon determining a cycle of the fractional micro-step period $T_n$. Additionally, or alternatively, the nano-step register 32 may receive an input which operates the nano-step register in accordance with a positional and velocity operation described at FIG. 6.

Figure 11:
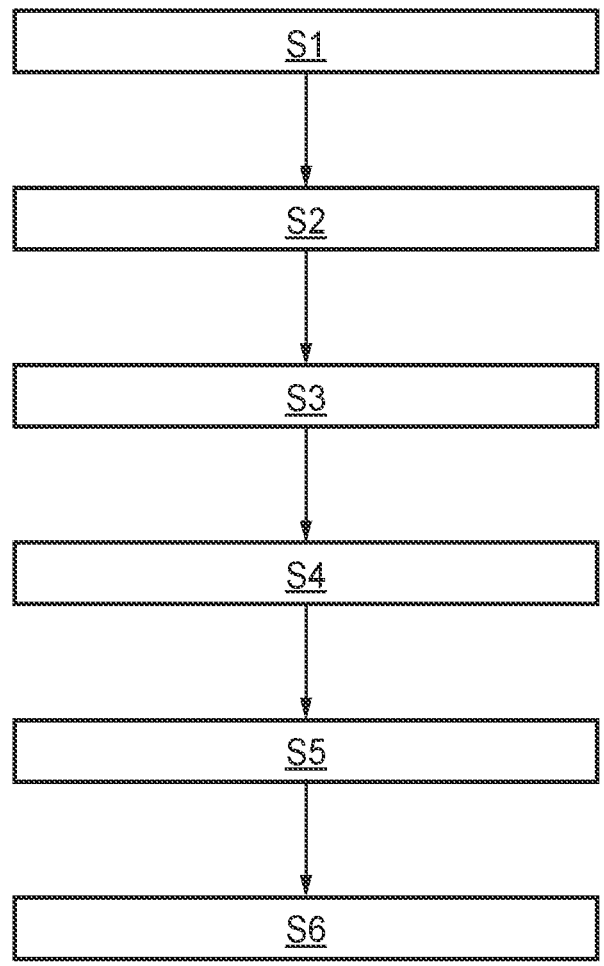
FIG. 11 illustrates the method which may be applied to other stepper motor control schemes to implement a high number of micro-steps with a reduced cost, reduced die size, and reduced engineering effort when compared to an overall increase in the number of micro-step values within a micro-step sequencer.

FIG. 11 shows the method which may be applied to other stepper motor control schemes to implement a high number of micro-steps with a reduced cost, reduced die size, and reduced engineering effort when compared to an overall increase in the number of micro-step values within a micro-step sequencer. Such a method, as shown in FIG. 11, to determine a target current of a motor coil of a stepper motor comprising at least a first motor coil and a second motor coil, may comprise the following steps:

S1: Providing a quantised waveform representing micro-stepped current;

S2: generating, by the micro-step sequencer, a first micro-step value associated with a first phase angle position of the quantised waveform;

S3: generating a second micro-step value associated with a second phase angle position of the quantised waveform;

S4: providing a fractional value representing a fraction between the first micro-step value and the second micro-step value;

S5: interpolating, between the first micro-step value and the second micro-step value, based on the fractional value, to generate a fractional micro-step value;

S6: generating a target current value based on the fractional micro-step value, wherein the target current value is suitable for operating the stepper motor.

NUMBERED CLAUSES

By way of non-limiting example, some aspects of the disclosure are set out in the following numbered clauses.

Numbered clause 1) A circuit arrangement for operating a stepper motor, the circuit arrangement comprising:
a micro-step sequencer configured to:
store a plurality of micro-step values associated with discrete values of a quantised waveform,
output at least: a first micro-step value associated with a first phase angle position of the quantised waveform; and a second micro-step value associated with a second phase angle position of the quantised waveform;
a register configured to store a fractional value, wherein the fractional value represents a fraction between the first micro-step value and the second micro-step value;
an interpolator configured to:
receive the first micro-step value, the second micro-step value, and the fractional value;
interpolate, between the first micro-step value and the second micro-step value, based on the fractional value;
determine a fractional micro-step value from the interpolation; wherein circuit arrangement is configured to:
operate the stepper motor based on the fractional micro-step value.

Numbered clause 2) The circuit arrangement of clause 1, wherein the circuit arrangement further comprises an adder configured to add the first micro-step value and the fractional micro-step value, wherein the stepper motor is operated based on the output of the adder.

Numbered clause 3) The circuit arrangement of any of clauses 1 or 2, wherein the circuit arrangement further comprises a timing unit for operating the stepper motor to a target position, wherein the timing unit determines a time rate, wherein the micro-step sequencer is configured to output one micro-step value upon each period of the time rate, wherein the interpolator is configured to determine one fractional micro-step value, based on a corresponding fractional value, upon each period of the time rate.

Numbered clause 4) The circuit arrangement of clauses 2 and 3, wherein the adder is configured to add the first micro-step value and the fractional micro-step value once per time rate.

Numbered clause 5) The circuit arrangement of any preceding clause, wherein the circuit arrangement further comprises a timing unit for operating the stepper motor at a target velocity, wherein the timing unit determines a first time rate and a second time rate, wherein the second time rate is a multiple of the first time rate, wherein the micro-step sequencer is configured to output one micro-step value upon each period of the first time rate, wherein the interpolator is configured to determine one fractional micro-step value upon each period of the second time rate.

Numbered clause 6) The circuit arrangement of clause 5 when dependent on clause 2, wherein the adder is configured to add the first micro-step value and the fractional micro-step value once per second time rate.

Numbered clause 7) The circuit arrangement of any of clauses 5 or 6, wherein the fractional value is a fraction represented by the mathematical expression 1/b, where b is an integer number, wherein the second time rate is the multiple of b times the first time rate.

Numbered clause 8) The circuit arrangement of any preceding clause, further comprising a switch which disconnects the interpolator output if the velocity of the stepper motor rotor is greater than a velocity threshold.

Numbered clause 9) The circuit arrangement of any preceding clause, wherein the fractional micro-step value represents a phase angle position between the first phase angle position and the second phase angle position.

Numbered clause 10) The circuit arrangement of any preceding clause, wherein the micro-step sequencer comprises a look-up table, wherein the first micro-step value is in a first row of the look-up table, and the second micro-step value is in a second row of the look-up table, wherein the second row immediately follows the first row.

Numbered clause 11) The circuit arrangement of any preceding clause, wherein the micro-step sequencer is configured to receive a signal which increments the position of the quantised waveform.

Numbered clause 12) The circuit arrangement of any preceding clause, wherein a target current value is determined based on the fractional micro-step value and the stepper motor is operated based on the target current value.

Numbered clause 13) The circuit arrangement of clause 12, wherein the target current value is a vector representing the target current of a first motor coil of the stepper motor and the target current of a second motor coil of the stepper motor.

Numbered clause 14) The circuit arrangement of any preceding clause, wherein the quantised waveform is sinusoidal.

Numbered clause 15) The circuit arrangement of any preceding clause, wherein the interpolator is a linear interpolator configured to linearly interpolate between the first micro-step value and the second micro-step value to generate the fractional micro-step value.

Numbered clause 16) The circuit arrangement of any preceding clause, wherein the interpolator is a filter configured to filter the first micro-step value and the second micro-step value to generate the fractional micro-step value.

Numbered clause 17) The circuit arrangement of any preceding clause, wherein the interpolator is a weighted time slot assignment applied to the first micro-step value and the second micro-step value to generate the fractional micro-step value.

Numbered clause 18) A method for determining a target current of one or more motor coils of a stepper motor, the method comprising:
providing a quantised waveform representing micro-stepped current;
generating a first micro-step value associated with a first phase angle position of the quantised waveform;
generating a second micro-step value associated with a second phase angle position of the quantised waveform;
providing a fractional value representing a fraction between the first micro-step value and the second micro-step value;
interpolating, between the first micro-step value and the second micro-step value, based on the fractional value, to generate a fractional micro-step value;
generating a target current value based on the fractional micro-step value, wherein the target current value is suitable for operating the stepper motor.

Numbered clause 19) A method for determining a target current of one or more motor coils of a stepper motor, the method comprising:
providing, by a micro-step sequencer, a quantised waveform representing micro-stepped current;
generating, by the micro-step sequencer, a first micro-step value associated with a first phase angle position of the quantised waveform;
generating, by the micro-step sequencer, a second micro-step value associated with a second phase angle position of the quantised waveform;
providing, by a register, a fractional value representing a fraction between the first micro-step value and the second micro-step value;
interpolating, by an interpolator, between the first micro-step value and the second micro-step value, wherein the interpolating is based on the fractional value to generate a fractional micro-step value;
generating a target current value based on the fractional micro-step value, wherein the target current value is suitable for operating the stepper motor.

Numbered clause 20) The method of any of clauses 18 or 19, further comprising adding the first micro-step value and the fractional micro-step value, wherein the target current value is based on the addition of the first micro-step value and the fractional micro-step value.

Numbered clause 21) The method of any of clauses 18 to 20, further comprising:
outputting one micro-step value upon each period of a time rate; and
determining one fractional micro-step value, based on a corresponding fractional value upon, each period of the time rate.

Numbered clause 22) The method of clauses 20 and 21, wherein the addition of the first micro-step value and the fractional micro-step value is performed once per time rate.

Numbered clause 23) The method of any of clauses 18 to 22, further comprising:
outputting one micro-step value upon each period of the first time rate; and
determining one fractional micro-step value, based on a corresponding fractional value upon, upon each period of the second time rate, wherein the second time rate is a multiple of the first time rate.

Numbered clause 24) The method of clause 23 when dependent on clause 20, wherein the addition of the first micro-step value and the fractional micro-step value is performed once per second time rate.

Numbered clause 25) The method of any of clauses 23 or 24, wherein the fractional value is a fraction represented by the mathematical expression 1/b, where b is an integer number, wherein the second time rate is the multiple of b times the first time rate.

Numbered clause 26) The method of any of clauses 18 to 25, further comprising disconnecting the interpolator output if the velocity of the stepper motor rotor is greater than a velocity threshold.

Numbered clause 27) The method of any of clauses 18 to 26, wherein the fractional micro-step value represents a phase angle position between the first phase angle position and the second phase angle position.

Numbered clause 28) The method of any of clauses 19 to 27, wherein the micro-step sequencer comprises a look-up table, wherein the first micro-step value is in a first row of the look-up table, and the second micro-step value is in a second row of the look-up table, wherein the second row immediately follows the first row.

Numbered clause 29) The method of any of clauses 19 to 28, further comprising receiving, the micro-step sequencer, a signal which increments the position of the quantised waveform.

Numbered clause 30) The method of any of clauses 18 to 29, further comprising:
 determining a target current based on the fractional micro-step value; and,
 operating the stepper motor based on the target current value.

Numbered clause 31) The method of clause 30, wherein the target current value is a vector representing the target current of a first motor coil of the stepper motor and the target current of a second motor coil of the stepper motor.

Numbered clause 32) The method of any of clauses 19 to 31, wherein the quantised waveform is sinusoidal.

Numbered clause 33) The method of any of clauses 19 to 32, wherein the interpolating comprises linearly interpolating between the first micro-step value and the second micro-step value to generate the fractional micro-step value.

Numbered clause 34) The method of any of clauses 19 to 33, wherein the interpolating comprises filtering the first micro-step value and the second micro-step value to generate the fractional micro-step value.

Numbered clause 35) The method of any of clauses 19 to 34, wherein the interpolating comprises a weighted time slot assignment applied to the first micro-step value and the second micro-step value to generate the fractional micro-step value.

Numbered clause 36) The method of any of claims 18 to 35 may be computer implemented method.

General

The output of the interpolator 34 may be a fractional micro-step value which represents a value between the first micro-step value and the second micro-step value which may be applied directly to the control signal generation block 24.

FIG. 6 shows an output of the timing unit 21 coupled to the nano-step register 32. Additionally, or alternatively, an output of the timing unit 21 coupled to the interpolator 34 to achieve similar functionality and technical effect as described above.

In an alternative embodiment, the stepper motor may be operated with prior art techniques until the stepper motor position reaches the target position. Upon reaching the target position, the stepper motor may be operated to provide increased accuracy using one or more fractional micro-steps.

Each block of FIG. 1 and FIG. 3 is shown and defined for explanatory purposes only, it would be well understood that the algorithm or function which each block represents may be implemented in a plurality of other ways so long as the functionality as described is present. For example, the blocks of FIGS. 1 and/or 3 may be combined and implemented as part of a circuit arrangement, on a single integrated circuit, processor, or computer, or implemented by a plurality of circuit arrangements, integrated circuits, processors, and/or computers.

Unless the context clearly requires otherwise, throughout the description and the claims, the words "comprise," "comprising," "include," "Including," and the like are to be construed in an inclusive sense, as opposed to an exclusive or exhaustive sense; that is to say, in the sense of "Including, but not limited to."

The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list.

It is to be understood that one or more features from one or more of the above-described embodiments may be combined with one or more features of one or more other ones of the above-described embodiments, so as to form further embodiments which are within the scope of the appended claims.

What is claimed is:

1. A circuit arrangement for operating a stepper motor, the circuit arrangement comprising:
 a micro-step sequencer configured to:
  store micro-step values associated with discrete values of a quantised waveform, and
  output: a first micro-step value associated with a first phase angle position of the quantised waveform, and a second micro-step value associated with a second phase angle position of the quantised waveform;
 a register configured to store a fractional value, wherein the fractional value represents a fraction between the first micro-step value and the second micro-step value; and
 an interpolator configured to:
  receive the first micro-step value, the second micro-step value, and the fractional value,
  interpolate, between the first micro-step value and the second micro-step value, based on the fractional value, and
  determine a fractional micro-step value from the interpolation; and
 wherein the circuit arrangement is configured to operate the stepper motor based on the fractional micro-step value.

2. The circuit arrangement of claim 1, wherein:
 the circuit arrangement further comprises an adder configured to add the first micro-step value and the fractional micro-step value; and the stepper motor is operated based on an output of the adder.

3. The circuit arrangement of claim 2, wherein the adder is configured to add the first micro-step value and the fractional micro-step value once per period of a time rate.

4. The circuit arrangement of claim 2, wherein:
the circuit arrangement further comprises a timing unit for operating the stepper motor at a target velocity;
the timing unit determines a first time rate having first time rate periods and a second time rate having second time rate periods;
the second time rate is a multiple of the first time rate;
the micro-step sequencer is configured to output one of the micro-step values upon each of the first time rate periods of the first time rate; and
the interpolator is configured to determine the fractional micro-step value upon each of the second time rate periods of the second time rate.

5. The circuit arrangement of claim 4, wherein the adder is configured to add the first micro-step value and the fractional micro-step value once per each of the second time rate periods of the second time rate.

6. The circuit arrangement of claim 4, wherein:
the fractional value is the fraction represented by a mathematical expression 1/b, where b is an integer number; and
the second time rate is the multiple of b times the first time rate.

7. The circuit arrangement of claim 1, wherein:
the circuit arrangement further comprises a timing unit for operating the stepper motor to a target position;
the timing unit determines a time rate having periods;
the micro-step sequencer is configured to output one of the micro-step values upon each of the periods of the time rate; and
the interpolator is configured to determine the fractional micro-step value, based on a corresponding fractional value, upon each of the periods of the time rate.

8. The circuit arrangement of claim 1, further comprising a switch which disconnects an output of the interpolator If a velocity of a rotor of the stepper motor is greater than a velocity threshold.

9. The circuit arrangement of claim 1, wherein the fractional micro-step value represents a phase angle position between the first phase angle position and the second phase angle position.

10. The circuit arrangement of claim 1, wherein:
the micro-step sequencer comprises a look-up table;
the first micro-step value is in a first row of the look-up table, and the second micro-step value is in a second row of the look-up table; and
the second row immediately follows the first row.

11. The circuit arrangement of claim 1, wherein the micro-step sequencer is configured to receive a signal which increments a position of the quantised waveform.

12. The circuit arrangement of claim 1, wherein the stepper motor is operated based on a target current value determined based on the fractional micro-step value.

13. The circuit arrangement of claim 12, wherein the target current value is a vector representing a first target current of a first motor coil of the stepper motor and a second target current of a second motor coil of the stepper motor.

14. The circuit arrangement of claim 1, wherein the quantised waveform is sinusoidal.

15. The circuit arrangement of claim 1, wherein the interpolator is a linear interpolator configured to linearly interpolate between the first micro-step value and the second micro-step value to generate the fractional micro-step value.

16. The circuit arrangement of claim 1, wherein the interpolator is a filter configured to filter the first micro-step value and the second micro-step value to generate the fractional micro-step value.

17. The circuit arrangement of claim 1, wherein the interpolator is a weighted time slot assignment applied to the first micro-step value and the second micro-step value to generate the fractional micro-step value.

18. A method for determining a target current of a motor coil of a stepper motor, the method comprising:
providing a quantised waveform representing micro-stepped current;
generating a first micro-step value associated with a first phase angle position of the quantised waveform;
generating a second micro-step value associated with a second phase angle position of the quantised waveform;
providing a fractional value representing a fraction between the first micro-step value and the second micro-step value;
interpolating, between the first micro-step value and the second micro-step value, based on the fractional value, to generate a fractional micro-step value; and
generating a target current value based on the fractional micro-step value, wherein the target current value is suitable for operating the stepper motor.

19. A method for determining a target current of a motor coil of a stepper motor, the method comprising:
providing, by a micro-step sequencer, a quantised waveform representing micro-stepped current;
generating, by the micro-step sequencer, a first micro-step value associated with a first phase angle position of the quantised waveform;
generating, by the micro-step sequencer, a second micro-step value associated with a second phase angle position of the quantised waveform;
providing, by a register, a fractional value representing a fraction between the first micro-step value and the second micro-step value;
interpolating, by an interpolator, between the first micro-step value and the second micro-step value, wherein interpolating is based on generating a fractional micro-step value base on the fractional value; and
generating a target current value based on the fractional micro-step value, wherein the target current value is suitable for operating the stepper motor.

20. The method of claim 19, further comprising:
outputting the first micro-step value or the second micro-step value upon each period of a time rate having periods; and
determining the fractional micro-step value, based on a corresponding fractional value upon each of the periods of the time rate.

* * * * *